(12) United States Patent
Kato et al.

(10) Patent No.: US 10,850,775 B2
(45) Date of Patent: Dec. 1, 2020

(54) VEHICLE LOWER PORTION STRUCTURE

(71) Applicant: TOYOTA JIDOSHA KABUSHIKI KAISHA, Toyota (JP)

(72) Inventors: Makoto Kato, Nissin (JP); Kotaro Shirotori, Okazaki (JP); Shota Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/191,983

(22) Filed: Nov. 15, 2018

(65) Prior Publication Data

US 2019/0152530 A1 May 23, 2019

(30) Foreign Application Priority Data

Nov. 20, 2017 (JP) ................. 2017-223097

(51) Int. Cl.
| | | |
|---|---|---|
| B62D 21/15 | (2006.01) | |
| B62D 21/03 | (2006.01) | |
| B62D 25/20 | (2006.01) | |
| B62D 21/05 | (2006.01) | |
| F01M 11/00 | (2006.01) | |

(52) U.S. Cl.
CPC .......... *B62D 21/155* (2013.01); *B62D 21/03* (2013.01); *B62D 21/05* (2013.01); *B62D 21/15* (2013.01); *B62D 25/2072* (2013.01); *F01M 2011/0008* (2013.01)

(58) Field of Classification Search
CPC ...... B62D 21/155; B62D 21/03; B62D 21/15; B62D 21/05; B62D 25/2072; F01M 2011/0008

USPC .................................................. 296/204
See application file for complete search history.

(56) References Cited

U.S. PATENT DOCUMENTS

| | | | | |
|---|---|---|---|---|
| 5,048,888 | A | 9/1991 | Willy et al. | |
| 6,926,352 | B2* | 8/2005 | Gotou ................. | B62D 21/157 296/187.08 |
| 7,883,113 | B2* | 2/2011 | Yatsuda ................ | B62D 21/11 180/232 |
| 2009/0226806 | A1 | 9/2009 | Kiya | |

FOREIGN PATENT DOCUMENTS

| | | |
|---|---|---|
| JP | 2553405 B2 | 11/1996 |
| JP | 2007-230329 | 9/2007 |
| JP | 2016-84033 | 5/2016 |

* cited by examiner

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

In a vehicle lower portion structure, a plurality of cross members are suspended along a vehicle width direction between a pair of side rails. Further, an oil pan guard is suspended along a longitudinal direction between a No. 2 cross member and a No. 3 cross member to protect an oil pan of a transmission from below. When a vehicle collides on its front, engagement between the oil pan guard and the cross member is released, to thereby prevent a decrease in the amount of collision energy to be absorbed by the pair of side rails.

14 Claims, 14 Drawing Sheets

VEHICLE LOWER PORTION STRUCTURE

CROSS REFERENCE TO RELATED APPLICATION

The disclosure of Japanese Patent Application No. 2017-223097 filed on Nov. 20, 2017 including specification, claims, drawings and abstract is incorporated herein by reference in its entirety.

TECHNICAL FIELD

The present disclosure relates to a lower portion structure of a vehicle.

BACKGROUND

JP 2,553,405 B discloses a lower portion structure of a vehicle including a pair of side members (side rails) extended along a vehicle longitudinal direction and spaced from each other in a vehicle width direction, and a plurality of cross members suspended along the vehicle width direction between the pair of side members.

In the vehicle including the pair of side members as described in JP 2,553,405 B, when a vehicle collides on its front (hereinafter referred to as a "frontal collision"), the pair of side members are deformed to thereby absorb collision energy. This deformation shortens the distances, from each other, of the plurality of cross members suspended between the pair of side members.

Meanwhile, a guard member, such as an undercover, which covers a part or substantially the whole of a vehicle body, may be installed in a lower portion of the vehicle to prevent on-board components, such as a power unit and an electrical component, from being contacted by a stepping stone or an on-road obstacle, or to improve aerodynamic performance of the vehicle. Further, brace members extending along a longitudinal direction of the vehicle may be installed, in some cases, as a part of the guard member for the purpose of enhancing the strength of the guard member.

Here, in a case where the plurality of cross members are suspended between the pair of side members as described in JP 2,553,405 B, for example, if the brace members extending along the longitudinal direction of the vehicle as described above are suspended between the plurality of cross members which bridge the pair of side members, there is a possibility that the brace members could hinder deformation of the pair of side members in response to the frontal collision, and an amount of collision energy to be absorbed by the side members could be decreased accordingly.

In consideration of the above-described possibility, an object of the present disclosure is to provide a vehicle lower portion structure in which mutually incompatible features can be incorporated, the features being that a brace member is installed between a plurality of cross members which are disposed to bridge a pair of side members, and that there is prevented a decrease in an amount of collision energy to be absorbed by the pair of side members in response to a frontal collision.

SUMMARY

In one aspect, the present disclosure provides a vehicle lower portion structure including a pair of right and left side members that are extended along a vehicle longitudinal direction on both sides of a vehicle width direction in a vehicle and constitute a part of a vehicle body, a first cross member that is suspended between the pair of side members along the vehicle width direction, a second cross member that is suspended between the pair of side members along the vehicle width direction, the second cross member being arranged rearward in the vehicle longitudinal direction of the first cross member so as to be spaced from the first cross member in the vehicle longitudinal direction, an on-board component that is mounted on the vehicle body in a lower portion of the vehicle, and a guard member that is disposed downward, in a vehicle vertical direction, of the on-board component. In the vehicle lower portion structure, the guard member includes a brace member that is suspended along the vehicle longitudinal direction between the first cross member and the second cross member, and fastened to at least one of the first cross member and the second cross member by a bolt, the brace member having an insertion hole through which the bolt is inserted. Further, in the vehicle lower portion structure, the insertion hole is formed in a shape of an elongated hole including a passable portion which is extended from a fastening position where the bolt inserted through the insertion hole is tightened to fasten the brace member toward a center region, in the vehicle longitudinal direction, of the brace member.

In the above aspect of the present disclosure, because the passable portion is provided to the insertion hole defined in the brace member of the guard member which protects the on-board component, the insertion hole through which the bolt for fastening the brace member onto the first cross member or the second cross member is inserted, and is extended from the fastening position, at which the bolt inserted through the insertion hole is tightened to fasten the brace member, toward the center region, in the vehicle longitudinal direction, of the brace member, the capability of the brace member that functions to hinder deformation of the pair of side members at the occurrence of a frontal collision can be suppressed, to thereby prevent a decrease in the amount of collision energy to be absorbed by the pair of side members. This is achieved by a feature that the bolt is movable relative to the brace member toward the passable portion in the insertion hole when a collision load from the forward side of the vehicle is exerted on the pair of side members to thereby deform the pair of side members and accordingly cause the first cross member and the second cross member to attempt to reduce a distance from each other.

In the vehicle lower portion structure according to one aspect of the present disclosure, the insertion hole may include, in a region from the fastening position to the passable portion, a tied-up section in which a size of the insertion hole in the vehicle width direction is not increased.

Because the tied-up section in which the insertion hole is not increased in size along the vehicle width direction is defined in the region from the fastening position to the passable portion, the guard member can be effectively used as a load transfer member at the occurrence of an asymmetrical collision (such as an offset collision at which a load from the forward side of a vehicle is not input to the tip ends of the pair of side members, a micro-wrap collision, or an oblique collision) for hindering the side members from becoming deformed to an excessive extent. This is based on the reasons below. When the vehicle collides asymmetrically, one of the side members is deformed to a greater extent than that of the other of the side members, which causes the first cross member to be retreated by an amount that differs between right and left in the vehicle width direction of the first cross member, and, in turn, causes one end of the first cross member to attempt taking a position rotated rearward with respect to the other end of the first cross member. In this attempt, because a load whose major component lies along the vehicle width direction is exerted on the bolt fixed to a bottom surface of the first cross member or a bottom surface of the second cross member, the bolt is not able to move relative to the brace member over a distance sufficient for reaching the passable portion, which allows the tied-up section to limit relative movement of the bolt. In this way, the guard member can be effectively used as the load transfer member at the occurrence of the asymmetrical collision to hinder excessive deformation of the side members.

Meanwhile, at the occurrence of a frontal collision, because the right and left regions of the first cross member 16 are retreated by the same amount or by amounts that do not significantly vary from each other, the bolt is able to move relative to the brace member toward the passable portion within the insertion hole, to thereby suppress the capability of the brace member functioning to hinder deformation of the pair of side members, which can, in turn, prevent a decrease in the amount of collision energy to be absorbed by the side members.

In one aspect of the present disclosure, the vehicle lower portion structure includes a pair of right and left side members that are extended along a vehicle longitudinal direction on both sides of a vehicle width direction in a vehicle and constitute a part of a vehicle body, a first cross member that is suspended between the pair of side members along a vehicle width direction, a second cross member that is suspended between the pair of side members along the vehicle width direction, the second cross member being arranged rearward in the vehicle longitudinal direction of the first cross member so as to be spaced from the first cross member in the vehicle longitudinal direction, and a brace member that is suspended along the vehicle longitudinal direction between the first cross member and the second cross member, and fastened to at least one of the first cross member and the second cross member by a bolt, the brace member having an insertion hole through which the bolt is inserted. Further, in the vehicle lower portion structure, the insertion hole is formed in a shape of an elongated hole including a passable portion which is extended toward a center region of the brace member from a fastening position where the bolt inserted through the insertion hole is tightened to fasten the brace member, and also including a tied-up section in which a size, in the vehicle width direction, of the insertion hole is not increased in a region from the fastening position to the passable portion.

In the above aspect of the present disclosure, relative movement of the bolt, which fastens the brace member to the first cross member or the second cross member, is limited by the tied-up section within the insertion hole at the occurrence of an asymmetrical collision. This allows the brace member to be effectively used as the load transfer member at the occurrence of the asymmetrical collision for preventing excessive deformation of the side members.

On the other hand, at the occurrence of the frontal collision, because the bolt is movable relative to the brace member toward the passable portion within the insertion hole to impair the functioning of the brace member as the load transfer member, it becomes possible to suppress the capability of the brace member functioning to hinder deformation of the side members, and accordingly prevent a decrease in the amount of collision energy to be absorbed by the side members.

In the lower portion structure according to one aspect of the present disclosure, the insertion hole may have a wider width section in which the size of the insertion hole along the vehicle width direction is defined to be greater than that in the fastening position, so as not to limit relative vertical movement of the bolt in the passable portion.

Because the size, in the vehicle width direction, of the insertion hole is designed to be greater than that in the tied-up section, so as not to limit relative vertical movement of the bolt, the bolt is able to escape from the insertion hole when the distance between the first cross member and the second cross member is shortened by deformation of the side members in response to a collision load exerted from the forward side of the vehicle onto the side members. This allows the brace member to be disengaged from the first cross member or the second cross member. As a result, the capability of the brace member functioning to hinder deformation of the pair of side members can be suppressed to prevent a decrease in the amount of collision energy to be absorbed by the side members.

In the lower portion structure according to one aspect of the present disclosure, the first cross member may have a bottom surface which faces downward in the vehicle vertical direction and a rear surface which is joined to the bottom surface via a first joint portion and arranged on a rear portion of the first cross member so as to face rearward in the vehicle longitudinal direction, while the brace member may include a first bottom portion which is formed substantially in parallel with the bottom surface of the first cross member and arranged so as to face the bottom surface, the first bottom portion in which the insertion hole is defined, and a first sloped wall portion which is formed on a rear region of the first bottom portion so as to be raised above toward a rear part and is located rearward, in the vehicle longitudinal direction, of the first joint portion in the first cross member.

With the above configuration, when the first cross member and the second cross member attempt to shorten the distance from each other in response to deformation of the side member caused by the collision load exerted from the forward side of the vehicle onto the side member, the first joint portion of the first cross member is brought into contact with the first sloped wall portion of the brace member, which can cause the brace member to be downwardly shifted with respect to the first cross member. Thus, the collision load which is input from forward the vehicle to the side member can facilitate escape of the bolt fixed to the bottom surface of the first cross member out of the wider width section of the insertion hole in the brace member, to thereby release engagement between the first cross member and the brace member. As a result, the capability of the guard member functioning to hinder deformation of the pair of side members at the occurrence of a frontal collision can be suppressed to thereby prevent a decrease in the amount of collision energy to be absorbed by the side member.

In the lower portion structure according to one aspect of the present disclosure, the second cross member may have a bottom surface which faces downward of the vehicle in the vertical direction and a front surface which is joined to the bottom surface via a second joint portion and arranged on a forward portion of the second cross member so as to face forward of the vehicle in the longitudinal direction, while the brace member may include a second bottom portion which is formed substantially in parallel with the bottom surface of the second cross member and arranged so as to face the bottom surface, the second bottom portion in which the insertion hole is defined, and a second sloped wall portion which is formed on a forward region of the second bottom portion so as to be raised above toward a front portion and is located forward, in the vehicle longitudinal direction, of the second joint portion in the second cross member.

With the above configuration, when the first cross member and the second cross member attempt to shorten the distance from each other in response to deformation of the side member caused by the collision load exerted from the forward side of the vehicle onto the side member, the second joint portion of the second cross member is brought into contact with the second sloped wall portion of the brace member, which can cause the brace member to be downwardly shifted with respect to the second cross member. Thus, the collision load which is input from the forward side of the vehicle to the side member can facilitate escape of the bolt fixed to the bottom surface of the second cross member out of the wider width section of the insertion hole in the brace member, to thereby release engagement between the second cross member and the brace member. As a result, the capability of the brace member functioning to hinder deformation of the pair of side members at the occurrence of a frontal collision can be suppressed to thereby prevent a decrease in the amount of collision energy to be absorbed by the side member.

In the vehicle lower portion structure according to one aspect of the present disclosure, each of the pair of side members may have a first curved portion which is curved so as to cause a rear portion, in the vehicle longitudinal direction, of the each of the side members to be outwardly displaced from a front portion thereof, and a second curved portion which is arranged rearward of the first curved portion and curved so as to align each of the pair of side members with the vehicle longitudinal direction. The first curved portion and the second curved portion may be formed on a site situated, in the vehicle longitudinal direction, between locations where the first cross member is suspended and where the second cross member is suspended from the each of the pair of side members.

In this way, at the occurrence of a frontal collision, the collision load can be effectively absorbed by the pair of side members each of which is curved at the first curved portion and the second curved portion.

In the vehicle lower portion structure according to one aspect of the present disclosure, the brace member may include a region having a closed shape in cross section taken along a direction perpendicular to the vehicle longitudinal direction, and a pair of such brace members may be arranged so as to be spaced from each other in the vehicle width direction. Further, the guard member may further include a plate-shaped member suspended between the pair of brace members.

The pair of brace members in the guard member can function to protect the on-board component against larger stepping stones and on-road obstacles, while the plate shaped member suspended between the pair of brace members in the guard member can function to protect the on-board component against smaller stepping stones and on-road obstacles. Accordingly, the guard member can protect the on-board component against the stepping stones and on-road obstacles having various sizes, while allowing the mass of the guard member to be maintained smaller, as compared to a case where the entire thickness of the guard member is increased rather than including the plate shaped member.

Advantageous Effects of Invention

The vehicle lower portion structure of the present disclosure has an advantageous effect of including mutually incompatible features of installing the brace member between the cross members each of which is suspended between the pair of side members, and preventing a decrease in the amount of collision energy to be absorbed by the pair of side members at the occurrence of a frontal collision.

BRIEF DESCRIPTION OF DRAWINGS

Embodiments of the present disclosure will be described by reference to the following figures, wherein.

DESCRIPTION OF EMBODIMENTS

Embodiment 1

Figure 1:
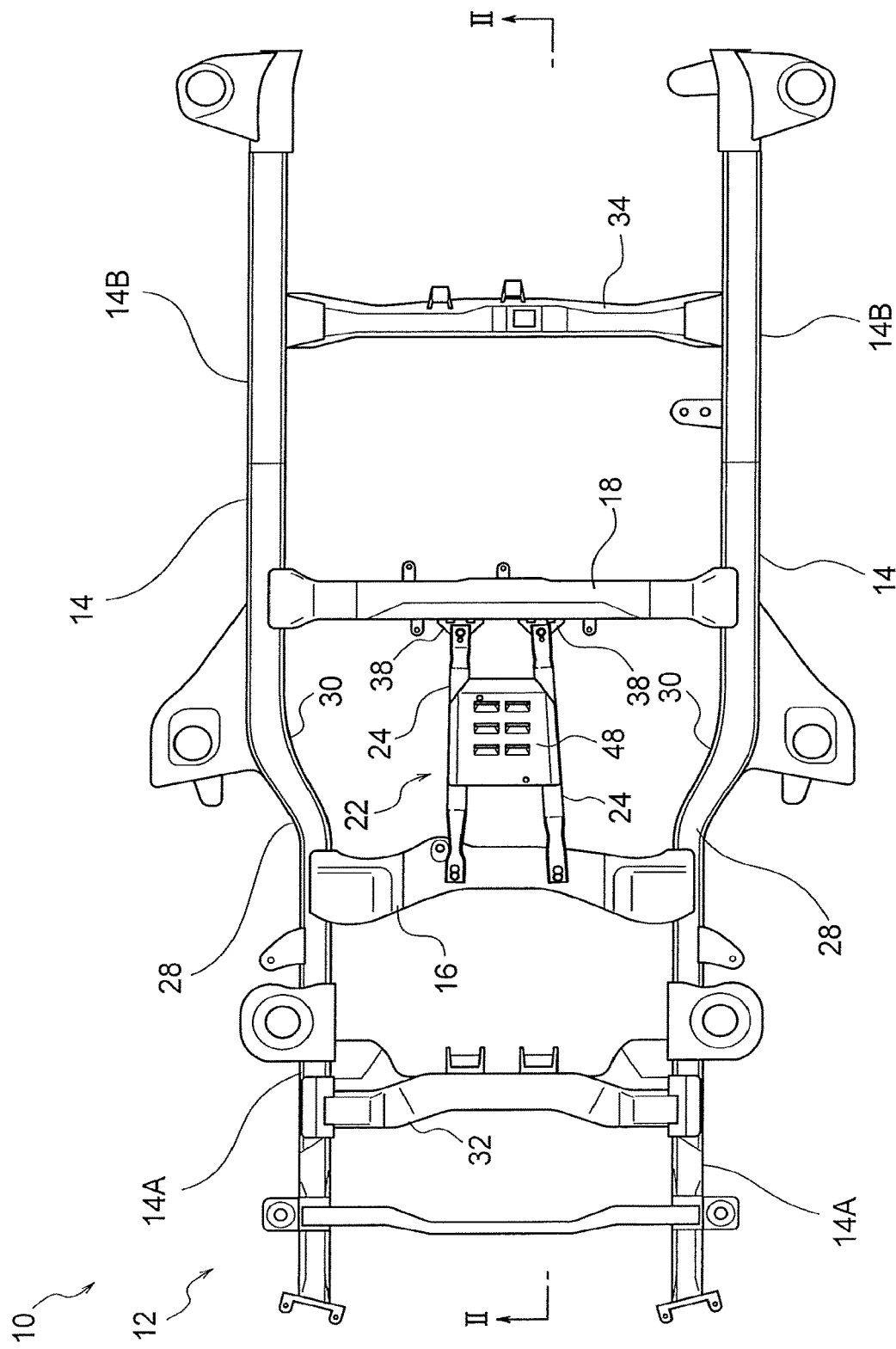
FIG. 1 is a bottom view of a vehicle according to a first embodiment, showing a frame portion of the vehicle in which a vehicle lower portion structure of this disclosure is applied.

FIG. 1 shows a frame portion of a vehicle 10 according to a first embodiment. It should be noted that in the drawings, arrows are shown as appropriate, in which an arrow FR points to a vehicle front side (a travel direction), an arrow UP points to a vehicle upper side, an arrow IN points to an inner side of a vehicle width direction, and an arrow OUT points to an outer side of the vehicle width direction. In the following explanation using the expressions back, forward, up, down, right, and left, unless otherwise specified, the expressions represent back and forward in a vehicle longitudinal direction, up and down in a vehicle vertical direction, right and left in a width direction of a vehicle facing the travel direction, respectively. The present disclosure is not limited to any of the embodiments described below. It should be noted that the descriptions below and drawings are simplified as appropriate.

Vehicle Lower Portion Structure

The vehicle 10 is formed as a vehicle having a frame structure (frame vehicle), and is explained below as an example to which a vehicle lower portion structure 12 according to the present disclosure is applied. The vehicle lower portion structure 12 in the vehicle 10 includes a pair of side rails 14 (corresponding to side members), a No. 2 cross member 16 (corresponding to a first cross member), a No. 3 cross member 18 (corresponding to a second cross member), a transmission 20 (corresponding to an on-board component), an oil pan guard 22 (corresponding to a guard member), and a brace member 24 constituting a part of the oil pan guard 22.

Side Rail

The side rails 14 arranged as a pair of side members on both right and left outer ends, in a vehicle width direction, of the vehicle 10 are extended along a vehicle longitudinal direction so as to constitute a part of the vehicle body. Here, in the explanation about one of the right and left side rails 14, the one of the pair of side rails 14 is simply referred to as the "side rail 14," while, in the explanation about both of the right and left side rails 14, 14 constituting the pair, they are referred to as the "pair of side rails 14." Regarding components disposed on both right and left sides constituting a pair, as deemed appropriate, only one of the pair of right and left components will be explained as a representative of them, and explanation about the other of the pair of right and left components will not be repeated. This applies to all components explained below.

It should be noted that the pair of side rails 14 are, for example, designed to be substantially symmetric with respect to the center in the vehicle width direction of the vehicle 10. Further, as an example, the side rail 14 is composed of steel members (a side rail inner member and a side rail outer member) having a U shape in cross section when viewed from the vehicle longitudinal direction, and the U-shaped steel members are joined in such a manner that a hollow and rectangular, closed shape is defined in cross section of the U-shaped steel members opposed to each other along the vehicle width direction.

A front tire 26, which is not shown in FIG. 1, is disposed outward in the vehicle width direction of the side rail 14 at a location corresponding to a front portion 14A located on a forward side in the vehicle longitudinal direction. In other words, the side rail 14 is opposed to the front tire 26 in the vehicle width direction. Therefore, in consideration of avoiding an interference from the front tire 26, a distance (an interval) along the vehicle width direction between the pair of side rails 14 is shortened in a region of the front portions 14A of the side rails 14 from that in a region of middle portions 14B located in the middle of the vehicle longitudinal direction of the side rails.

A first curved portion 28 and a second curved portion 30 are formed between the front portion 14A and the middle portion 14B of the side rail 14 in a plan view of the vehicle (when viewed from above along the vehicle vertical direction). Both of the curved portions 28 and 30 are disposed on a site of the side member 14 sandwiched, in the vehicle longitudinal direction, between positions of the No. 2 cross member 16 and the No. 3 cross member 18 suspended from the pair of side rails 14. Further, the first curved portion 28 is curved so as to outwardly displace a rear portion, in the vehicle longitudinal direction, of the side rail 14 from a front portion of the side rail 14, and the second curved portion 30 is arranged rearward of the first curved portion 28 and curved so as to align the guide rail 14 with the vehicle longitudinal direction. The curved portions 28 and 30 are designed to make the distance (interval) along the vehicle width direction between the pair of side rails 14 shorter in the region of the front portion 14A of the side rail 14 than that in the region of the middle portion 14B of the side rail 14 located in the middle of the vehicle in the longitudinal direction.

Further, the front portion 14A of the side rail 14 is designed, in consideration of arrangement of a suspension unit and other components, to be located higher than the middle portion 14B in the vehicle vertical direction, and to be projected upward in the middle of the vehicle longitudinal direction of the front portion 14A. In other words, the height of the side rail 14 from the ground becomes lower in the middle portion 14B than that in the front portion 14A, which is intended to provide, in the vehicle lower portion structure 12 of the first embodiment, an installation space for the transmission 20 which will be described below.

Cross Member

As shown in FIG. 1, the pair of side rails 14 are bridged in the vicinity of middle regions of the front portions 14A by a No. 1 cross member 32 along the vehicle width direction. Further, the pair of side rails 14 are bridged in rear regions of the front portions 14A by the No. 2 cross member 16 along the vehicle width direction. Still further, the pair of side rails 14 are bridged in forward regions of the middle portions 14B by the No. 3 cross member 18 along the vehicle width direction. Moreover, the pair of side rails 14 are also bridged in the vicinity of middle regions of the middle portions 14B by a No. 4 cross member 34 along the vehicle width direction. In other words, the No. 1 cross member 32, the No. 2 cross member 16, the No. 3 cross member 18, and the No. 4 cross member 34 are arranged in that order from a vehicle front side while being spaced from each other in the vehicle longitudinal direction, so as to be suspended between the pair of side rails 14 along the vehicle width direction. In this way, a ladder shaped frame is formed in the vehicle 10. It should be noted that the No. 1 cross member 32 has, in the vehicle width direction, a center region that is curved toward a rear region of the vehicle relative to both ends in the vehicle width direction. In addition, a rear tire 36, which is not illustrated, is disposed outside, in the vehicle width direction, of the side rail 14 at a position rearward of the No. 4 cross member 34 suspended between the pair of side rails 14. The side rail 14 is opposed, in the vehicle width direction, to the rear tire 36.

In addition, the No. 3 cross member 18 is equipped with a pair of connection brackets 38 for connecting rear ends of the pair of brace members 24 to the No. 3 cross member 18. The connection brackets 38 are arranged in a pair on right and left side of the vehicle width direction in the vicinity of the middle, in the vehicle width direction, of the No. 3 cross member 18 so as to be spaced from each other. The connection bracket 38 is formed in a trifurcated shape which is branched into three parts from its one end connected to the brace member 24 toward the other end connected to the No. 3 cross member 18 (from the front side toward the rear side of the vehicle). The connection bracket 38 is screw connected to the brace member 24 in a front end region of the connection bracket 38.

Figure 3:
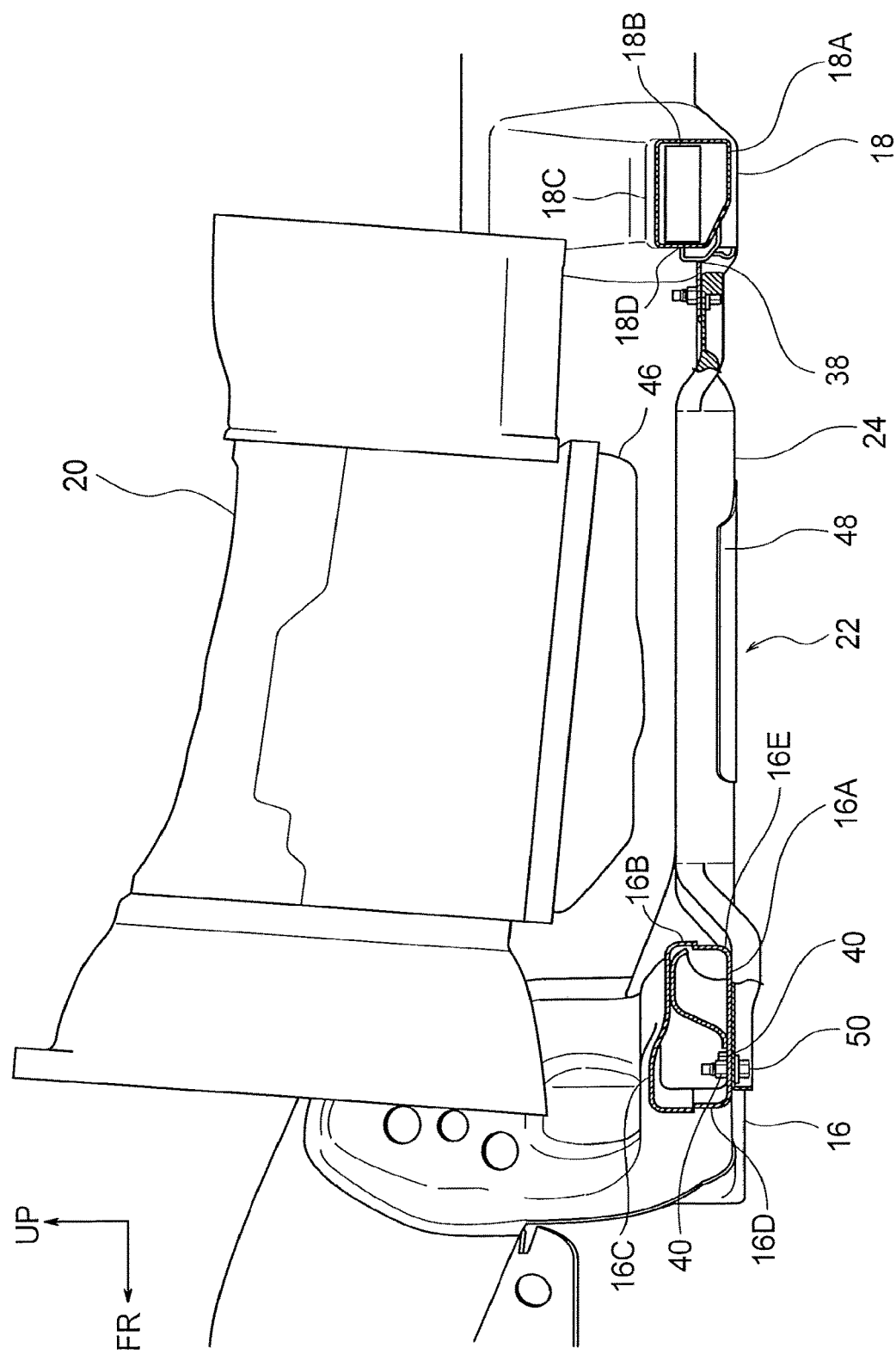
FIG. 3 is an enlarged side view showing a main part in the side view of FIG. 2.

In addition, each of the cross members 32, 16, 18, and 34 is composed of steel members (an upper member and a lower member) each having a U-shape in cross section when viewed from a side surface of the vehicle, and the U-shaped steel members are joined in such a manner that a hollow and rectangular, closed shape is defined in cross section of the U-shaped steel members opposed to each other along the vehicle vertical direction. In other words, the cross members 32, 16, 18, and 34 are composed of bottom surfaces 32A, 16A, 18A, and 34A, which are formed on their respective bottoms so as to face downward, rear surfaces 32B, 16B, 18B, and 34B, which are formed on their respective rear ends so as to face rearward, top surfaces 32C, 16C, 18C, and 34C, which are formed on their respective tops so as to face upward, and front surfaces 32D, 16D, 18D, and 34D, which are formed on their respective front ends so as to face forward. In particular, as shown in FIG. 3, the bottom surface 16A and the rear surface 16B of the No. 2 cross member 16 are joined to each other via a ridge line 16E functioning as a first joint portion (i.e., the ridge line 16E is defined by the bottom surface 16 and the rear surface 16B).

Two weld nuts 40 are welded on an inner face of the bottom surface 16A of the No. 2 cross member 16 at locations (corresponding to connection regions of the No. 2 cross member 16 and the brace member 24) spaced from each other in the vehicle width direction, and holes are defined directly below the weld nuts 40 in the bottom surface 16A of the No. 2 cross member 16 to receive bolts 50, which will be described below.

Transmission and Oil Pan

Figure 2:
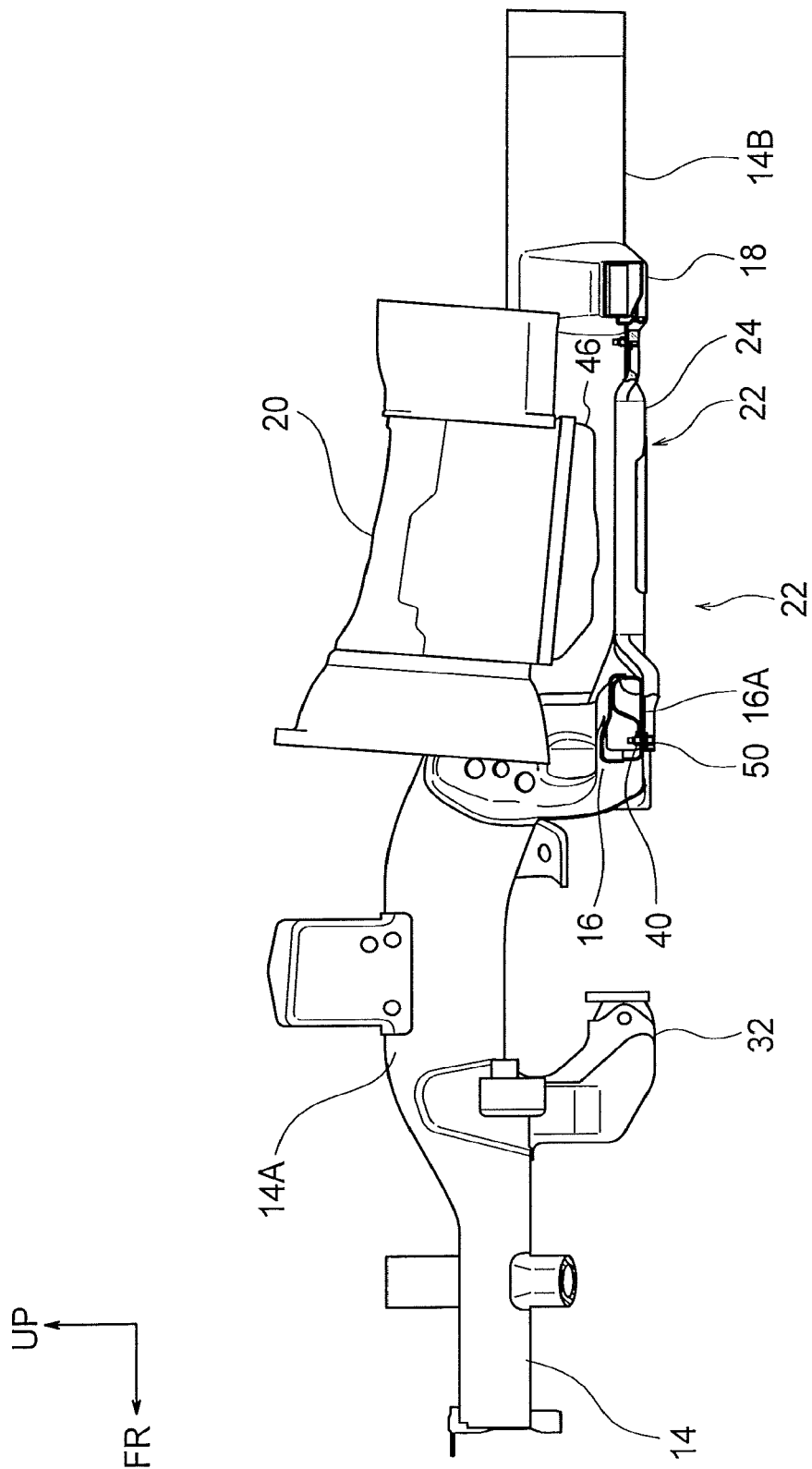
FIG. 2 is a side view of the frame portion of the vehicle which is illustrated in a state cut along line II-II in FIG. 1 together with an oil pan guard, a transmission, and an oil pan, and viewed from an inner side of a door along a thickness direction of the door.

As shown in FIG. 2, the transmission 20 being an on-board component is disposed in-between and above the No. 2 cross member 16 and the No. 3 cross member 18. The transmission 20 is, on its front side, connected to and supported by a not-illustrated engine 42, and on its rear side, supported via a not-illustrated mount 44 by the No. 3 cross member 18. In addition, an oil pan 46 is arranged below the transmission 20, which allows maintenance work, such as refilling of a transmission fluid, to be easily performed by lifting up the vehicle 10.

Oil Pan Guard

As shown in FIGS. 2 and 3, an oil pan guard 22 is disposed as a guard member below the transmission 20. The oil pan guard 22 in the first embodiment is provided for the purpose of preventing the oil pan 46 for the transmission 20, which is the on-board component, from being contacted by a stepping stone, an on-road obstacle, or other objects. In addition, as shown in FIGS. 4 to 7, the oil pan guard 22 includes the brace member 24 suspended along the vehicle longitudinal direction between the No. 2 cross member 16 and the No. 3 cross member 18. In the brace member 24, a front portion 24A and a rear portion 24C in the vehicle longitudinal direction of the brace member 24 are formed, in cross section taken along a direction perpendicular to the vehicle longitudinal direction, in the shape of an inverted letter U with an opening facing downward, and a central portion 24B sandwiched between the front portion 24A and the rear portion 24C is formed, in cross section taken along the direction perpendicular to the vehicle longitudinal direction, in the shape of a hollow rod so as to have increased strength. The material of the brace member 24 may be, for example, steel, an aluminum alloy, or the like. The brace member 24 may be extended along the vehicle longitudinal direction or may be slightly inclined relative to the vehicle longitudinal direction. In addition, the oil pan guard 22 according to the first embodiment may include a pair of brace members 24 spaced from each other in the vehicle width direction, and further include a plate shaped member 48 suspended along the vehicle width direction between the central portions 24B of the pair of brace members 24.

Brace Member

Figure 4:
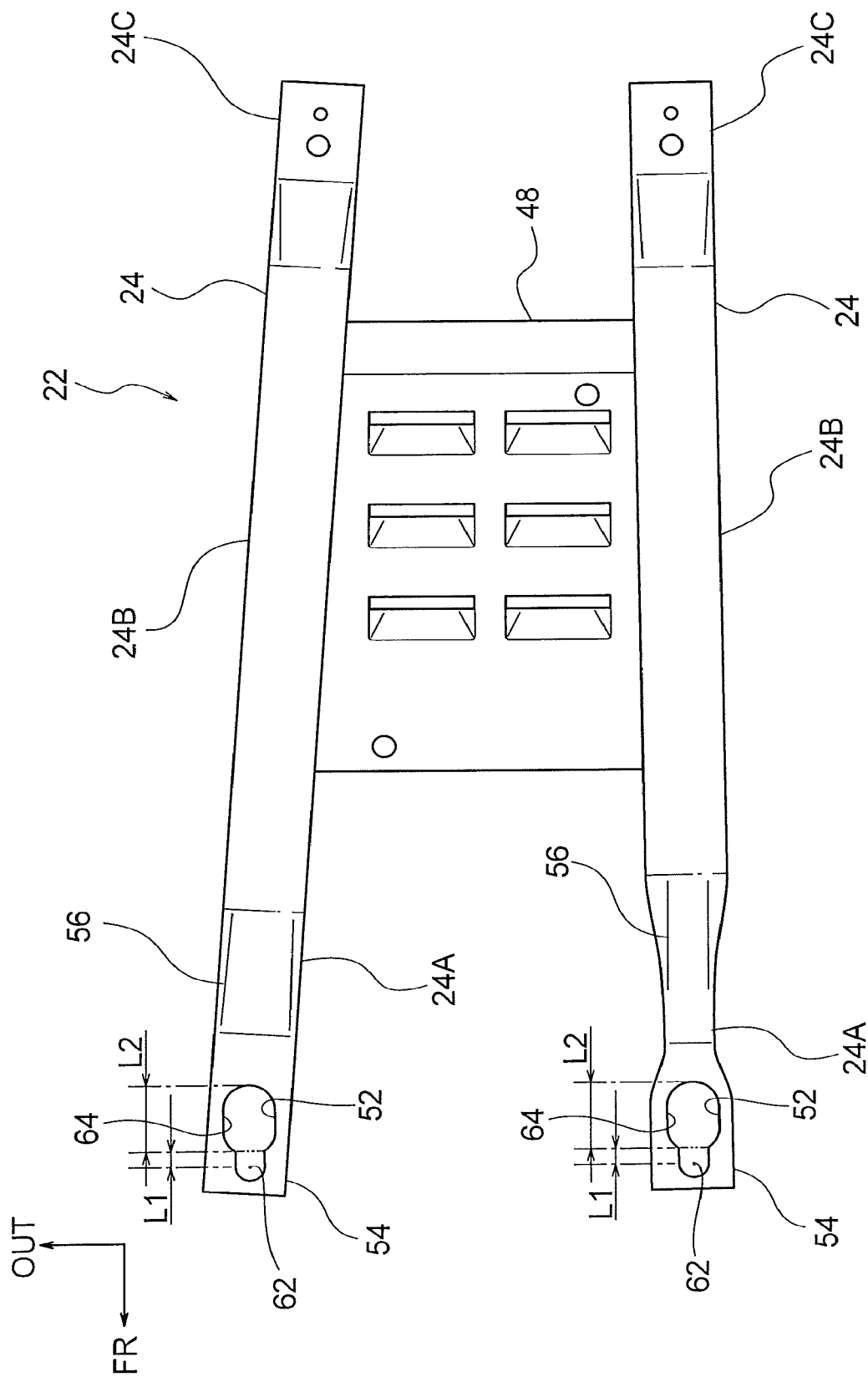
FIG. 4 is a plan view of the oil pan guard in the vehicle lower portion structure according to the first embodiment, viewed from above the vehicle.
Figure 6:
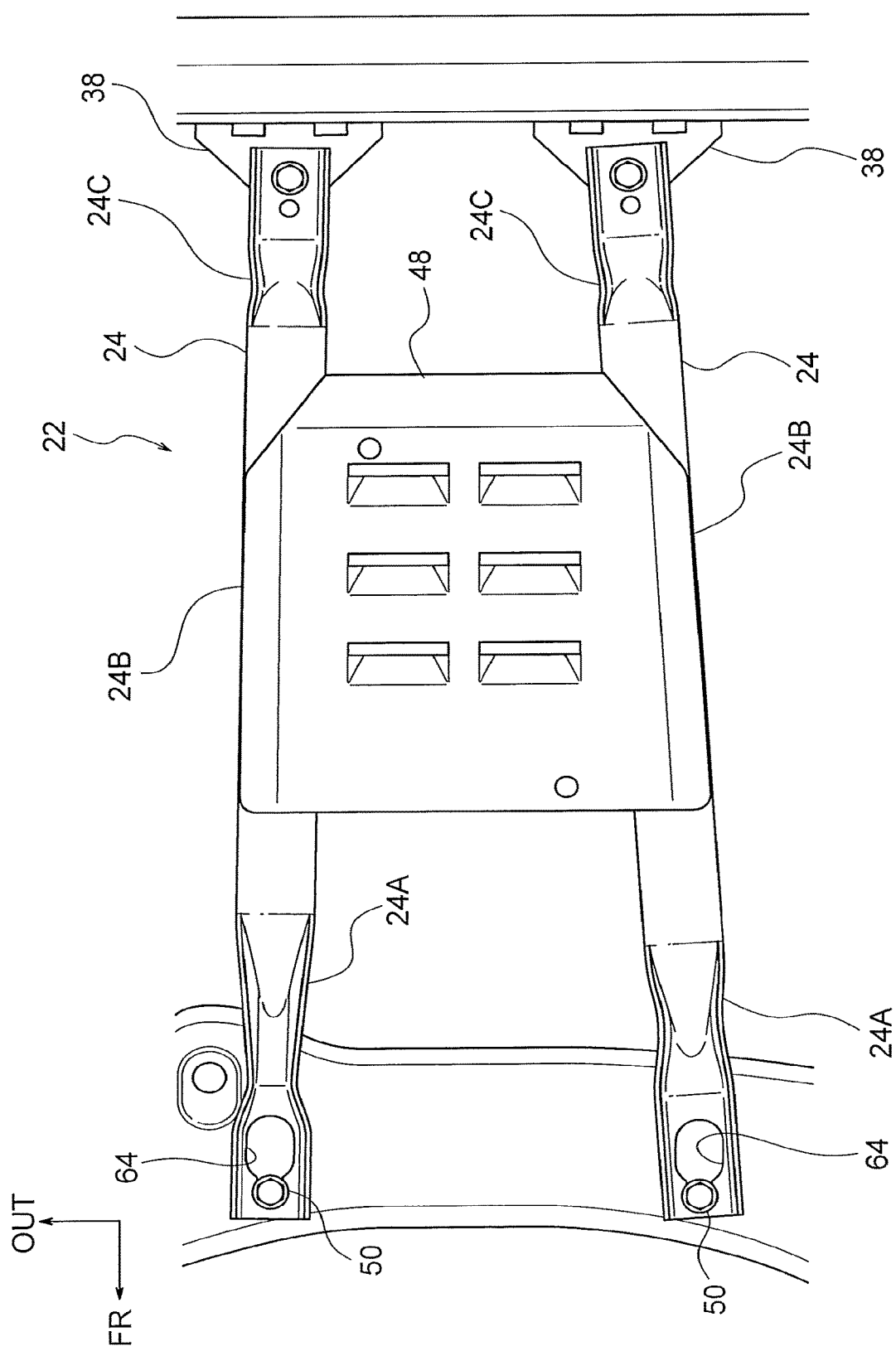
FIG. 6 is a bottom view of the oil pan guard in the vehicle lower portion structure according to the first embodiment, viewed from below the vehicle.
Figure 7:
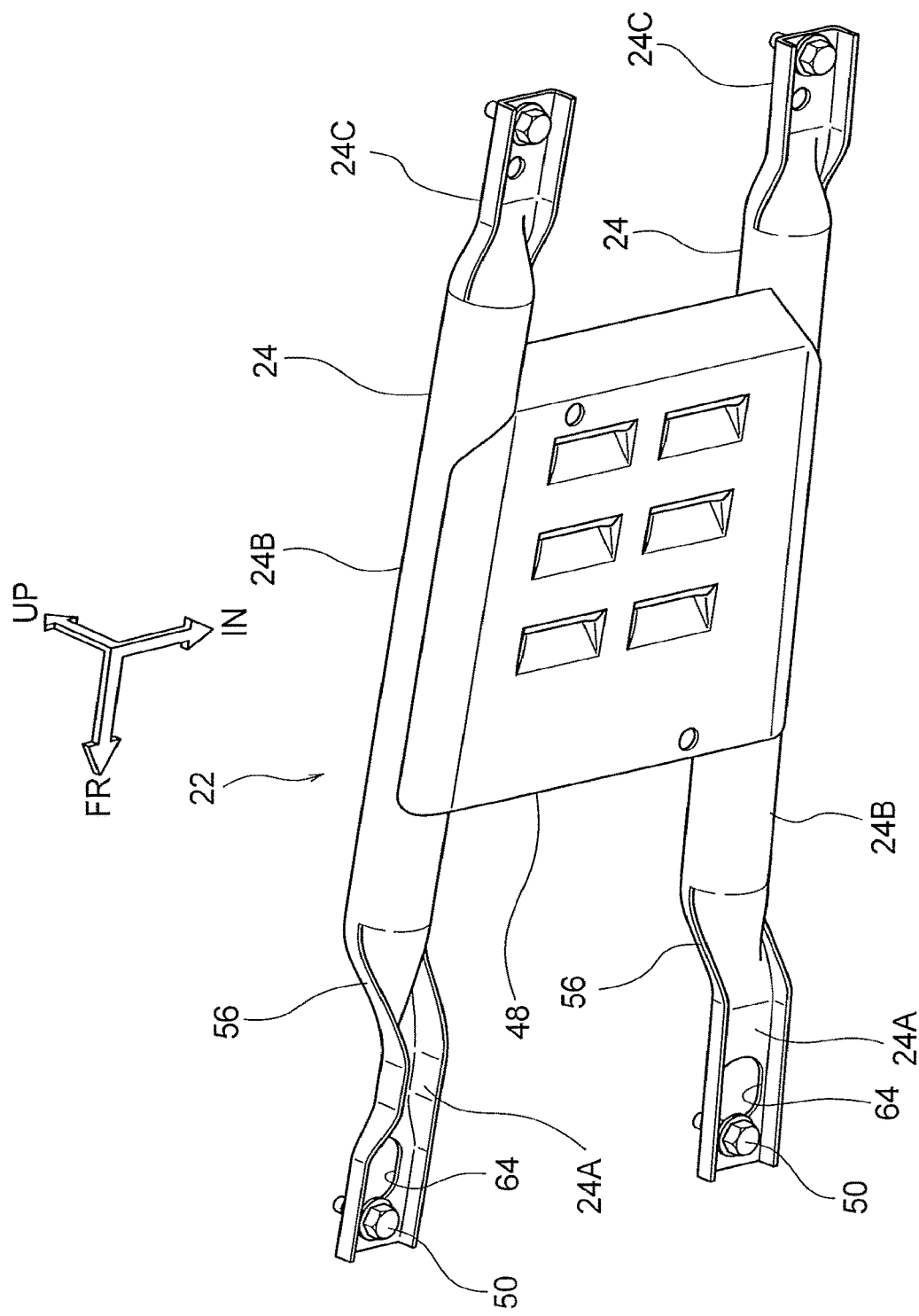
FIG. 7 is a perspective view of the oil pan guard in the vehicle lower portion structure according to the first embodiment viewed from rear and below the vehicle.

As shown in FIGS. 4 and 6, an insertion hole 52 through which the bolt 50 is inserted is defined in a portion (the front portion 24A in the first embodiment) on an end side, in the vehicle longitudinal direction, of the brace member 24. Then, the front portion 24A of the brace member 24 is contactingly fastened to the No. 2 cross member 16 by the bolt 50. Further, in the first embodiment, the brace member 24 has a first bottom portion 54 which is formed substantially in parallel with the bottom surface 16A of the No. 2 cross member 16 so as to face the bottom surface 16A, and the insertion hole 52 is defined in the first bottom portion 54.

The first bottom portion 54 of the brace member 24 is contactingly fastened to the bottom surface 16A of the No. 2 cross member 16 by screwing the bolt 50 inserted through the insertion hole 52 in the weld nut 40 provided on the inner face of the bottom surface 16A of the No. 2 cross member 16 as described above. Under the screwed condition, the bolt 50 presses the brace member 24 against the No. 2 cross member 16, to thereby fasten the brace member 24 in a condition unmovable with respect to the bolt 50. In this respect, when the bolt 50 is a flanged bolt, the brace member 24 is fastened to the No. 2 cross member 16 while being pressed by a flange of the flanged bolt. Meanwhile, when the bolt 50 presses the brace member 24 via a washer, the brace member 24 is fastened to the No. 2 cross member 16 while being pressed by the washer. In addition, the brace member 24 has an attachment surface which is formed in a flat shape attachable to the above-described connection bracket 38, and is screw connected at a rear end portion of the attachment surface to the connection bracket 38.

Figure 5:
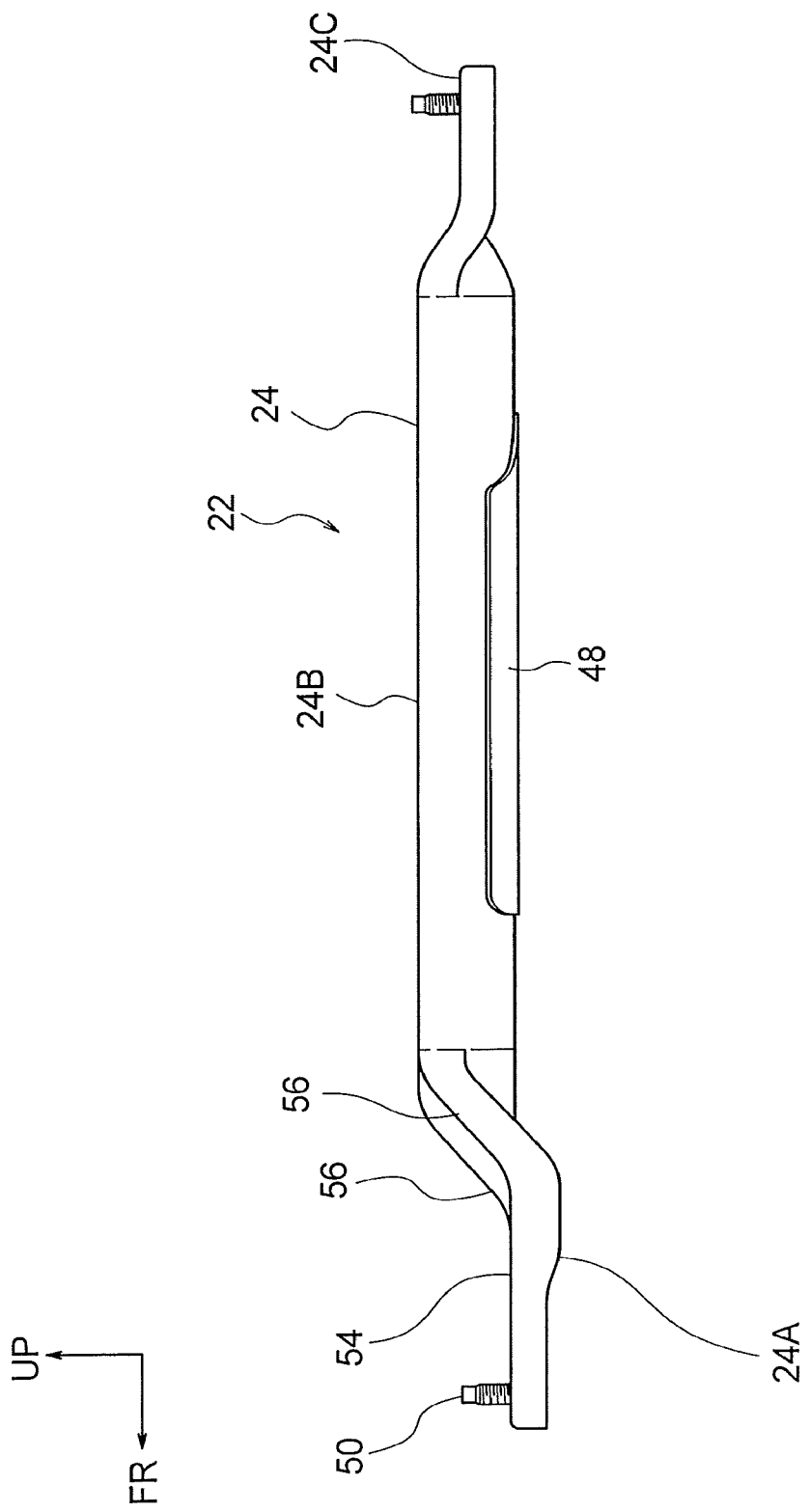
FIG. 5 is a side view of the oil pan guard in the vehicle lower portion structure according to the first embodiment.

Further, as shown in FIG. 5, the brace member 24 includes, in a rear portion of the first bottom portion 54, a first sloped wall portion 56 which is designed to rise higher toward a rear region, and arranged to face the rear surface 16B of the No. 2 cross member 16. The first sloped wall portion 56 is arranged to be located behind the ridge line 16E of the No. 2 cross member 16 in the vehicle longitudinal direction. In the first embodiment, a distance from the rear surface 16B of the No. 2 cross member to the front end of the first sloped wall portion 56 in the vehicle longitudinal direction is defined to be slightly longer than or substantially equal to a distance from the front end of the insertion hole 52 to the front end of a wider width section L2 in the vehicle longitudinal direction.

Insertion Hole

As shown in FIG. 4, the insertion hole 52 defined in the first bottom portion 54 of the brace member 24 is formed in the shape of an elongated hole including a passable portion 64 extended from a fastening position 62, at which the bolt 50 inserted through the insertion hole 52 is fixed to fasten the brace member 24, toward a central region of the oil pan guard 22 along the vehicle longitudinal direction (toward the rear side in the first embodiment). Specifically, the passable portion 64 is a part of the insertion hole 52, the part which is situated, when the bolt 50 is fixed to fasten the brace member 24, behind the rear end of a threaded portion of the bolt 50. It should be noted that a boundary of the passable portion 64 on the fastening position 62 side is drawn with a chain double-dashed line in FIG. 4 to facilitate understanding. The insertion hole 52 is the elongated hole whose inner diameter is greater in the vehicle longitudinal direction than that in the vehicle width direction. The fastening position 62 at which the bolt 50 is engaged with the brace member 24 is a position where the bolt 50 is inserted through the insertion hole 52 and screwed in the above-described weld nut 40 while being disabled to move relative to the brace member 24. Under this condition, the fastening position 62 coincides with the center axis of the bolt 50 extending through the insertion hole 52. It should be noted that, in the first embodiment, the dimension of the insertion hole 64 in the vehicle longitudinal direction is defined to be greater than an outer diameter of the threaded portion of the bolt 50, and the dimension of the insertion hole 52 in the vehicle longitudinal direction is defined to be greater than two times the outer diameter of the threaded portion of the bolt 50.

Further, in the first embodiment, as shown in FIG. 4, the insertion hole 52 includes, in a region from the fastening position 62 to the passable portion 64, a tied-up section L1 in which the passable portion 64 is not increased in size along the vehicle width direction. In the first embodiment, the size along the vehicle width direction is maintained substantially constant in the tied-up section L1. Alternatively, in the tied-up section L1, the size along the vehicle width direction may be slightly increased in the region from the fastening point 62 to the passable portion 64 (for example, an increase in size along the vehicle longitudinal direction of 5% or less).

Still further, in the first embodiment, as shown in FIG. 4, the insertion hole 52 also includes the wider width section L2 in which the dimension of insertion hole 52 along the vehicle width direction is defined to be greater than that in the fastening position 62, so that bolt 50 inserted through the insertion hole 52 is not disabled to relatively move along the vertical direction in the passable portion 64. Specifically, the dimension of the insertion hole 52 along the vehicle width direction is defined at the fastening position 62 to be smaller than the diameter of a head part of the bolt 50, but is defined in the wider width section L2 to be greater than the diameter of the head part of the bolt 50. It should be noted that when the bolt 50 is the flanged bolt, the diameter of the head part of the bolt 50 may be read as the diameter of the flange, and when the bolt 50 is brought into contact via a washer with the first bottom portion 54 of the brace member 24, the diameter of the head part of the bolt 50 may be read as a diameter of a larger one of the washer and the head part of the bolt 50.

In summary, the insertion hole 52 is the elongated hole including the passable portion 64, and in the first embodiment, the insertion hole 52 includes the tied-up section L1 in the region from the fastening position 62 to the passable portion 64, and further includes the wider width section L2 in the passable portion 64. That is, the insertion hole 52 of the first embodiment is formed as the elongated hole composed of two round corner rectangles which are partially overlapped in their longitudinal direction and extended along the vehicle longitudinal direction, while in the vehicle width direction, the two rectangles differ in size but share the same centerline. The round corner rectangle refers to a shape like an athletic stadium or a racetrack defined by two parallel straight parts and two curved parts that connect the two straight parts.

Operation and Effect

Next, operations and effects of the vehicle lower portion structure 12 according to the first embodiment will be described.

When the vehicle 10 is traveling, the pair of brace members 24 in the oil pan guard 22 can function to protect the oil pan 46 of the transmission 20, which is the on-board component, against larger stepping stones and on-road obstacles, and the plate shaped member 48 suspended between the pair of brace members 24 can function to protect the on-board component against smaller stepping stones and on-road obstacles. Accordingly, the oil pan 46 of the transmission 20 can be protected against the stepping stones and on-road obstacles having various different sizes while allowing the mass of the oil pan guard 22 to be maintained smaller, as compared with a case where the thickness and the strength of the entire oil pan guard 22 are increased rather than including the plate shaped member.

At the occurrence of a frontal collision of the vehicle 10, the pair of side rails 14 are deformed in response to a collision load input onto the front ends of the pair of side rails 14, thereby absorbing collision energy. Then, the distances along the longitudinal direction between the cross members 32 and 16 and 18 and 34 suspended between the pair of side rails 14 become smaller.

When the first curved portion 28 and the second curved portion 30 are formed as described in the first embodiment for each of the pair of side rails 14 at positions situated, in the vehicle longitudinal direction, between the locations where the No. 2 cross member 16 is suspended and where the No. 3 cross member 18 is suspended on each of the pair of side rails 14, an extent of deformation becomes particularly great in the first curved portion 28 and in the second curved portion 30 where an amount of collision energy to be absorbed is increased. In this case, a longitudinal distance between the No. 2 cross member 16 and the No. 3 cross member 18 is shortened more than those between the other cross members. It should be noted that when stress concentrating portions, such as the first and second curved portions 28, 30, are not provided, the side rail 14 is deformed more greatly on its vehicle front side.

Then, the load is transferred to the brace member 24 suspended between the No. 2 cross member 16 and the No. 3 cross member 18 when the No. 2 cross member 16 and the No. 3 cross member 18 attempt to shorten the distance from each other in the longitudinal direction. Here, in the first embodiment, because the No. 3 cross member 18 is retreated by an amount smaller than that of the No. 2 cross member 16, a compressive load is exerted on the brace member 24 along a direction in which the brace member 24 is extended.

Here, in the first embodiment, the insertion hole 52 defined in the brace member 24 is formed in the shape of the elongated hole having the passable portion 64 which is extended toward the center region, in the vehicle longitudinal direction, of the brace member 24 from the fastening position 62 where the bolt 50 is fastened. Because a frictional force produced by bolt connection between the brace member 24 and the bolt 50 is smaller than the above-described compressive load acting on the brace member 24, the bolt 50 is caused to move relative to the brace member 24 toward the passable portion 64 within the insertion hole 52 when the No. 2 cross member 16 and the No. 3 cross member 18 attempt to shorten the distance from each other at the occurrence of the frontal collision. This can suppress the capability of the brace member 24 functioning to hinder deformation of the pair of side rails 14 at the occurrence of the frontal collision, and can, in turn, prevent a decreased in the amount of collision energy to be absorbed by the side rails 14.

Meanwhile, when the vehicle 10 in the first embodiment collides asymmetrically, because the insertion hole 52 includes, in the region from the fastening position 62 to the passable portion 62, the tied-up section L1 where the insertion hole 52 is not increased in size along the vehicle width direction, the brace member 24 can be effectively used as the load transfer member, to thereby hinder excessive deformation of the side rail 14. This is based on the reasons below. In the first embodiment, the No. 2 cross member 16 is explained by way of illustration. At the occurrence of an asymmetrical collision, one of the side rails 14 is deformed to an extent greater than that of the other of the side rails 14, which causes the No. 2 cross member 16 to be retreated by an amount that differs between vehicle width right and left regions of the No. 2 cross member 16. Accordingly, one end of the No. 2 cross member 16 attempts to take a position rotated rearward with respect to the other end of the No. 2 cross member 16. In this attempt, a load whose major component lies along the vehicle width direction is exerted on the bolt 50 fixed to the No. 2 cross member 16, to thereby hinder the bolt 50 from moving relative to the brace member 24 over a distance sufficient for reaching the passable portion 64, which allows the tied-up section L1 to limit relative movement of the bolt 50. Therefore, at the occurrence of an asymmetrical collision, the brace member 24 can be utilized as the load transfer member to prevent excessive deformation of the side rail 14. As opposed to this, at the occurrence of a frontal collision, because the right and left regions of the No. 2 cross member 16 are retreated by substantially the same amount or by amounts that do not vary greatly between the right and left regions, the bolt 50 is able to move relative to the brace member 24 toward the passable portion 64 within the insertion hole 52.

Still further, in the first embodiment, the wider width section L2 is formed in the passable portion 64 of the insertion hole 52 so as not to hamper relative vertical movement of the bolt 50. Because of this, when the distance in the longitudinal direction between the No. 2 cross member 16 and the No. 3 cross member 18 is shortened due to deformation of the pair of side rails 14 at the occurrence of a frontal collision, the bolt 50 is moved from the fastening position 62 to the passable portion 64 within the insertion hole 52, which can cause the bolt 50 to escape from the insertion hole 52 after arriving at the wider width section L2. As a result, the brace member 24 can be disengaged from the No. 2 cross member 16. In this way, it becomes possible to suppress, at the occurrence of a frontal collision, the capability of the brace member 24 functioning to hinder deformation of the pair of side rails 14, and accordingly prevent a decrease in the amount of collision energy to be absorbed by the pair of side rails 14.

Moreover, in the first embodiment, when the No. 2 cross member 16 and the No. 3 cross member 18 attempt to shorten the distance therebetween, the ridge line 16E provided as the first joint portion of the No. 2 cross member is brought into contact with the first sloped wall portion 56 of the brace member 24, which allows the brace member 24 to move downward with respect to the No. 2 cross member 16. This facilitates escaping of the bolt 50 fixed to the bottom surface 16A of the No. 2 cross member 16 from the wider width section L2 out of the insertion hole 52 in the brace member 24, and allows disengagement of the No. 2 cross member 16 and the brace member 24. In other words, the brace member 24 can be hampered from bracing against the behavior of the No. 2 cross member 16 and the No. 3 cross member attempting to shorten the longitudinal distance from each other. In this way, at the occurrence of a frontal collision, it becomes possible to suppress the capability of the brace member 24 functioning to hinder deformation of the pair of side rails 14, and therefore prevent a decrease in the amount of collision energy to be absorbed by the pair of side rails 14.

Embodiment 2

Next, the vehicle lower portion structure 12 according to a second embodiment will be described. In the description below, components identical or equivalent to those of the first embodiment are designated by the same reference numerals as those of the first embodiment, and the descriptions related to the components will not be repeated. This is applied to the other embodiments which will be described further below.

Brace Member

Figure 8:
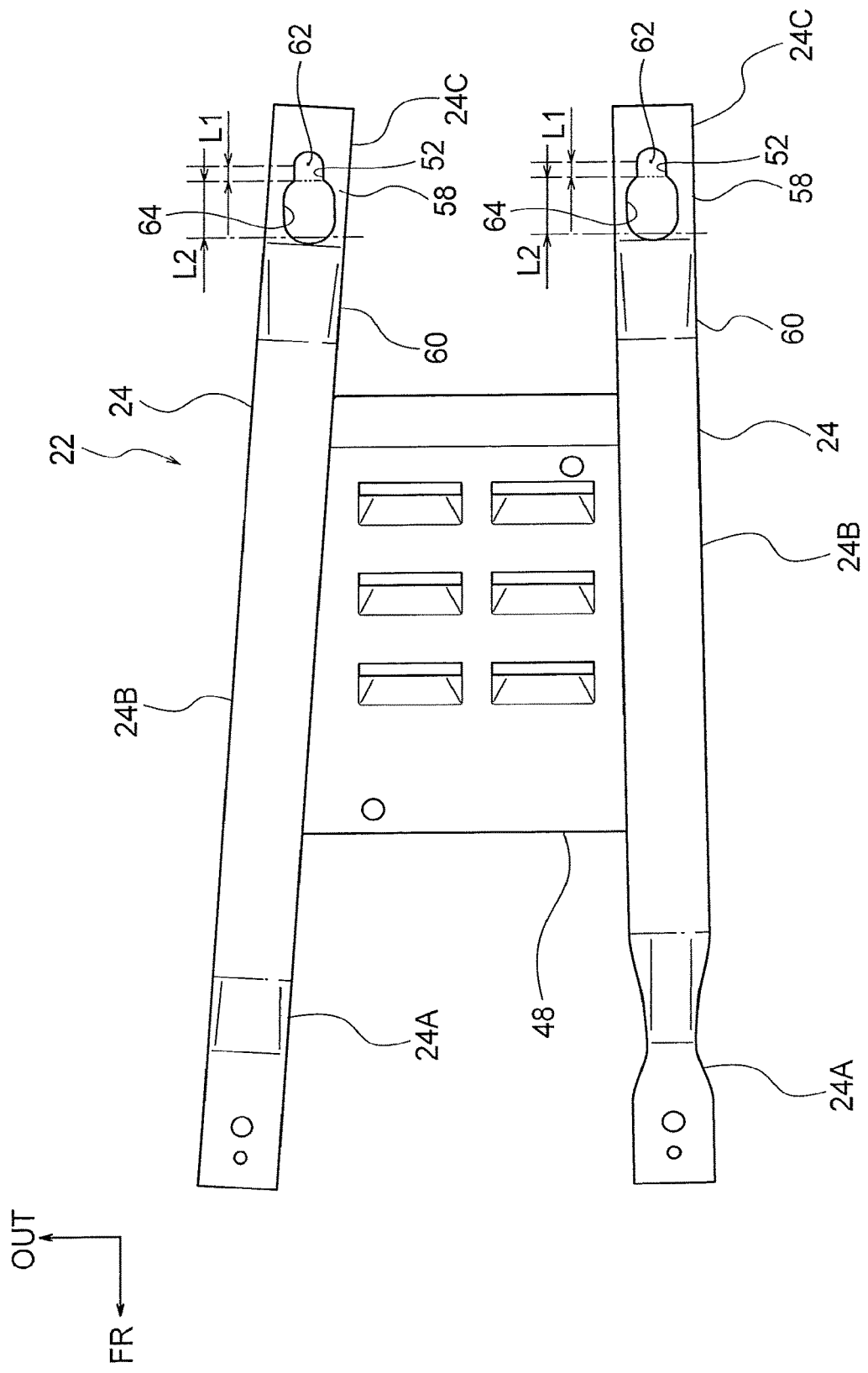
FIG. 8 is a perspective view of an oil pan guard in a vehicle lower portion structure according a second embodiment viewed from above the vehicle.
Figure 9:
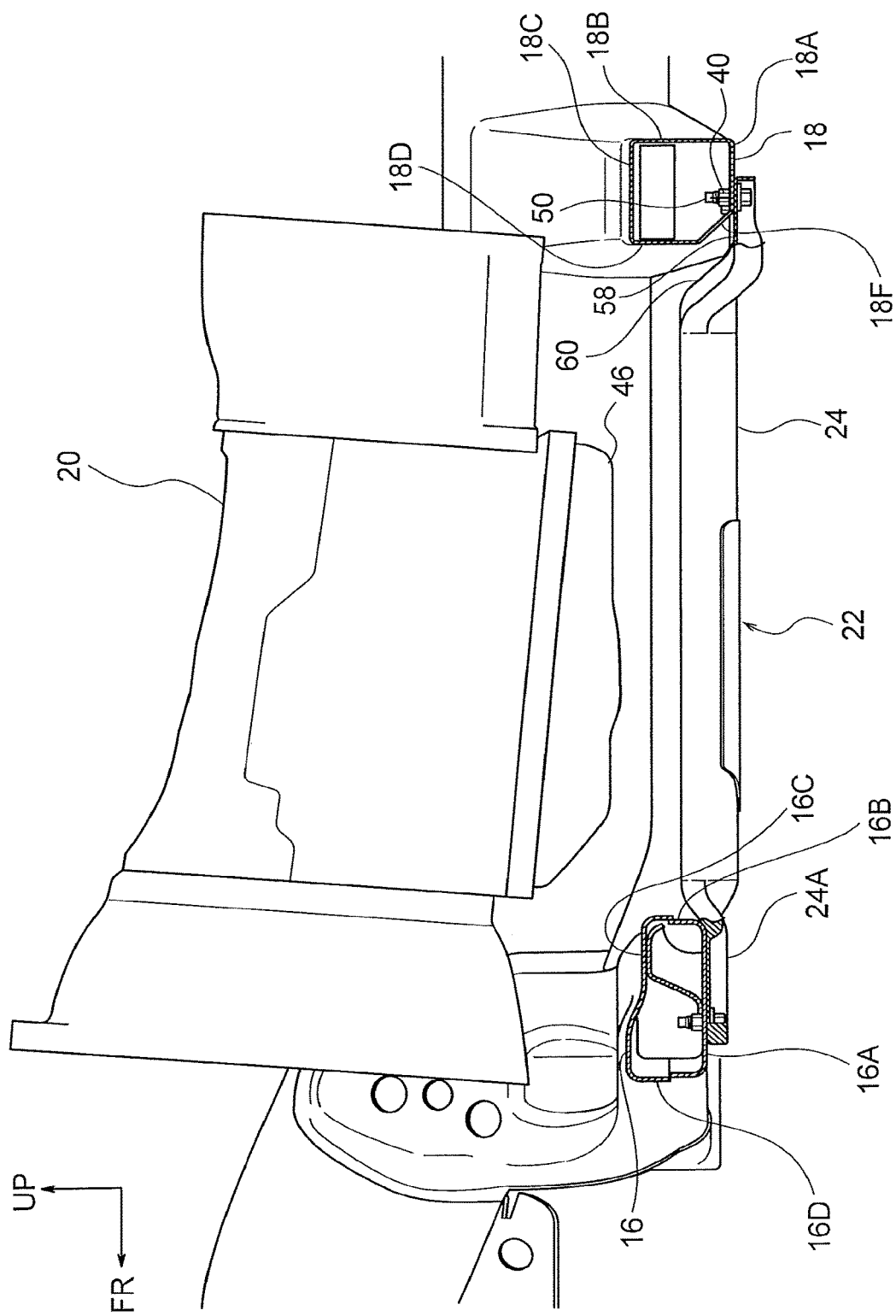
FIG. 9 is a side view of the oil pan guar in the vehicle lower portion structure according to the second embodiment.

In the second embodiment, as shown in FIGS. 8 and 9, the front portion 24A of the brace member 24 is fixed to the bottom surface 16A of the No. 2 cross member 16 through screw connection. On the other hand, the insertion hole 52 through which the bolt 50 is inserted is defined in the rear portion 14C of the brace member 24 which is a main feature of the second embodiment. In addition, the rear portion 24C of the brace member 24 is contactingly fastened to the No. 3 cross member 18 by screwing the bolt 50 in the weld nut 40 arranged on the inner face of the bottom surface 18A of the No. 3 cross member 18. Under the screwed condition, the bolt 50 presses the brace member 24 against the No. 3 cross member 18, to thereby fasten the brace member 24 in a condition unmovable with respect to the bolt 50.

Further, in the second embodiment, the brace member 24 has a second bottom surface 58 which is formed substantially in parallel with the bottom surface 18A of the No. 3 cross member 18, and is arranged to face the bottom surface 18A. Further, the insertion hole 52 is defined in the second bottom surface 58.

In addition, as shown in FIG. 8, the brace member 24 includes, in a front region of the second bottom portion 58, a second sloped wall portion 60 which is designed to rise higher toward a front side, and is arranged to face the front surface 18D of the No. 3 cross member 18. As shown in FIG. 9, the bottom surface 18A and the front surface 18D of the No. 3 cross member 18 are joined to each other via a joint surface 18F provided as a second joint portion. The second sloped wall portion 60 is arranged to be located forward, in the vehicle longitudinal direction, of the joint surface 18F in the No. 3 cross member.

Insertion Hole

The insertion hole 52 of the second embodiment has a substantially inverse shape of that in the first embodiment with respect to the vehicle longitudinal direction. Specifically, in the insertion hole 52 of the second embodiment, the passable portion 64 is defined from the fastening position 62 where the bolt 50 fastens the brace member 24 toward the center side; i.e., the forward side, in the vehicle longitudinal direction, of the brace member 24.

The insertion hole 52 of the second embodiment also includes the tied-up section L1 in the region from the fastening position 62 to the passable portion 64, and the wider width section L2 in the passable portion 62.

The features according to the second embodiment other than those described above are basically the same as those of the first embodiment.

Operation and Effect

Next, operation and effects of the vehicle lower portion structure 10 according to the second embodiment will be described.

When the No. 2 cross member 16 and the No. 3 cross member 18 attempt to shorten the distance from each other in the longitudinal direction at the occurrence of the frontal collision of the vehicle 10, the bolt 50 is relatively moved with respect to the insertion hole 52 toward the passable portion 64 in the insertion hole 52. In other words, the brace member 24 is retreated with respect to the No. 3 cross member 18. Then, the joint surface 18F being the second joint portion of the No. 3 cross member 18 is brought into contact with the second sloped wall portion 60 of the brace member 24, which allows the brace member 24 to move downward of the No. 3 cross member 18. This can facilitate escaping of the bolt 50 fixed to the bottom surface 18A of the No. 3 cross member 18 out of the wider width section L2 of the through hold 52 in the brace member 24 in response to the collision load input into the pair of side rails 14 at the occurrence of the frontal collision, and accordingly allows disengagement of the No. 3 cross member 18 from the brace member 24. In this way, the capability of the brace member 24 functioning to hinder deformation of the pair of side rails 14 can be suppressed at the occurrence of the frontal collision, to thereby prevent a decrease in the amount of collision energy to be absorbed by the pair of side rails 14.

Embodiment 3

Figure 10:
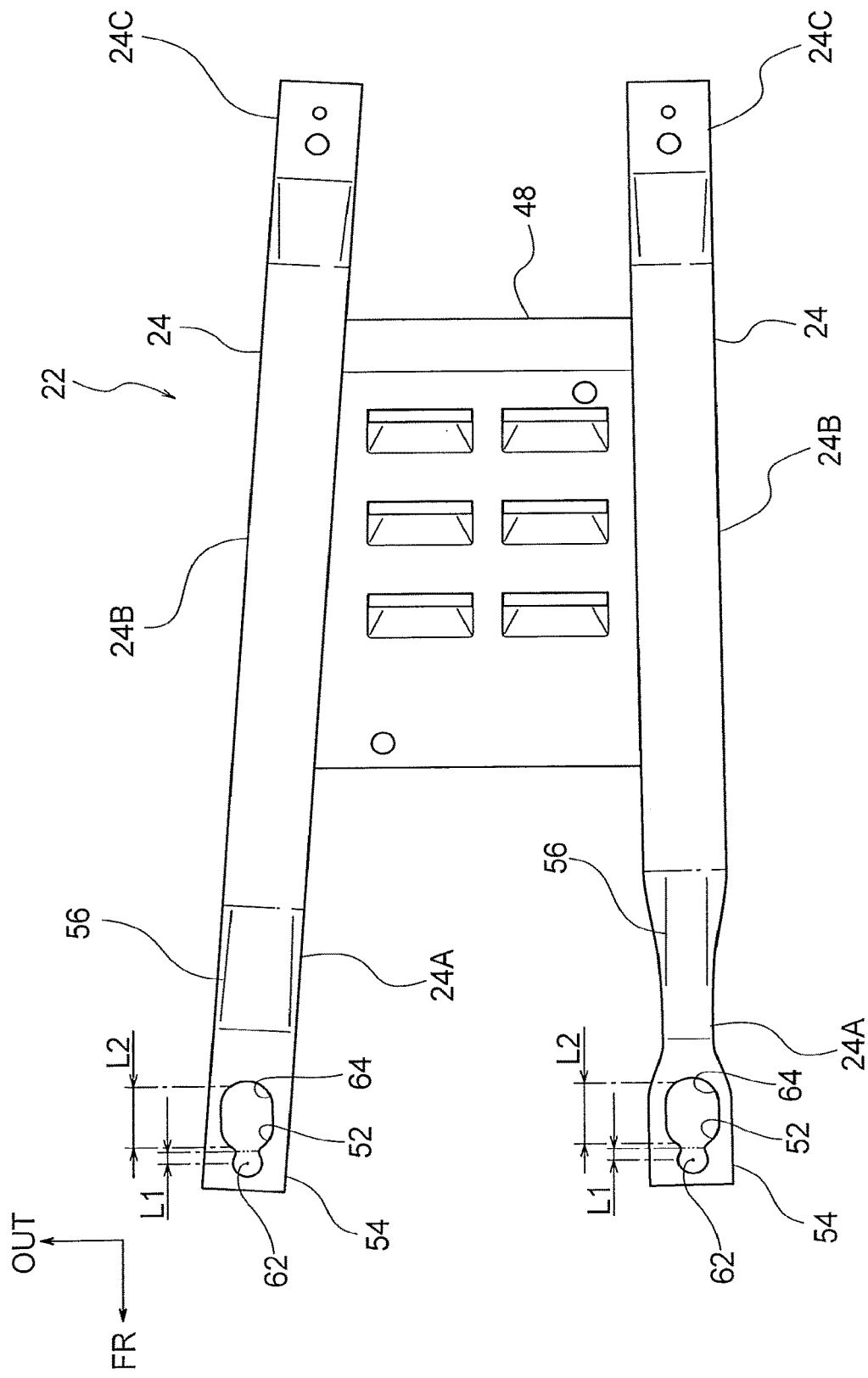
FIG. 10 is a perspective view of an oil pan guard in a vehicle lower portion structure according to a third embodiment viewed from above the vehicle.

Next, the vehicle lower portion structure 12 according to a third embodiment will be described.
Insertion Hole As shown in FIG. 10, the insertion hole 52 of the third embodiment is decreased in a width size along the vehicle width direction in a region from the fastening position 62 to the passable portion 64 in the tied-up section L1. In other words, the insertion hole 52 becomes constricted in the region from the fastening position 62 toward the passable portion 63. The other features of the insertion hole 52 are basically the same as those of the insertion hole 52 according to the first embodiment.
Operation and Effect Next, operations and effects of the vehicle lower portion structure 12 according to the third embodiment will be described.

In the third embodiment, because the width size of the insertion hole 52 is decreased in the tied-up section L1 in the region from the fastening position 62 to the passable portion 64, it can be further ensured, at the occurrence of an asymmetrical collision of the vehicle 10, that the bolt 50 is prevented from relatively moving toward the passable portion 64 in response to the asymmetrical collision, to effectively utilize the brace member 24 as the load transfer member. In this way, excessive deformation of the side rail 14 can be prevented. On the other hand, at the occurrence of a frontal collision, because right and left regions of the No. 2 cross member are retreated by amounts that are substantially equal to each other or amounts that do not significantly vary from each other, the bolt 50 is allowed to move relative to the brace member 24 with respect to the insertion hole 52 toward the passable portion 64 in the insertion hole 52.

Embodiment 4

Figure 11:
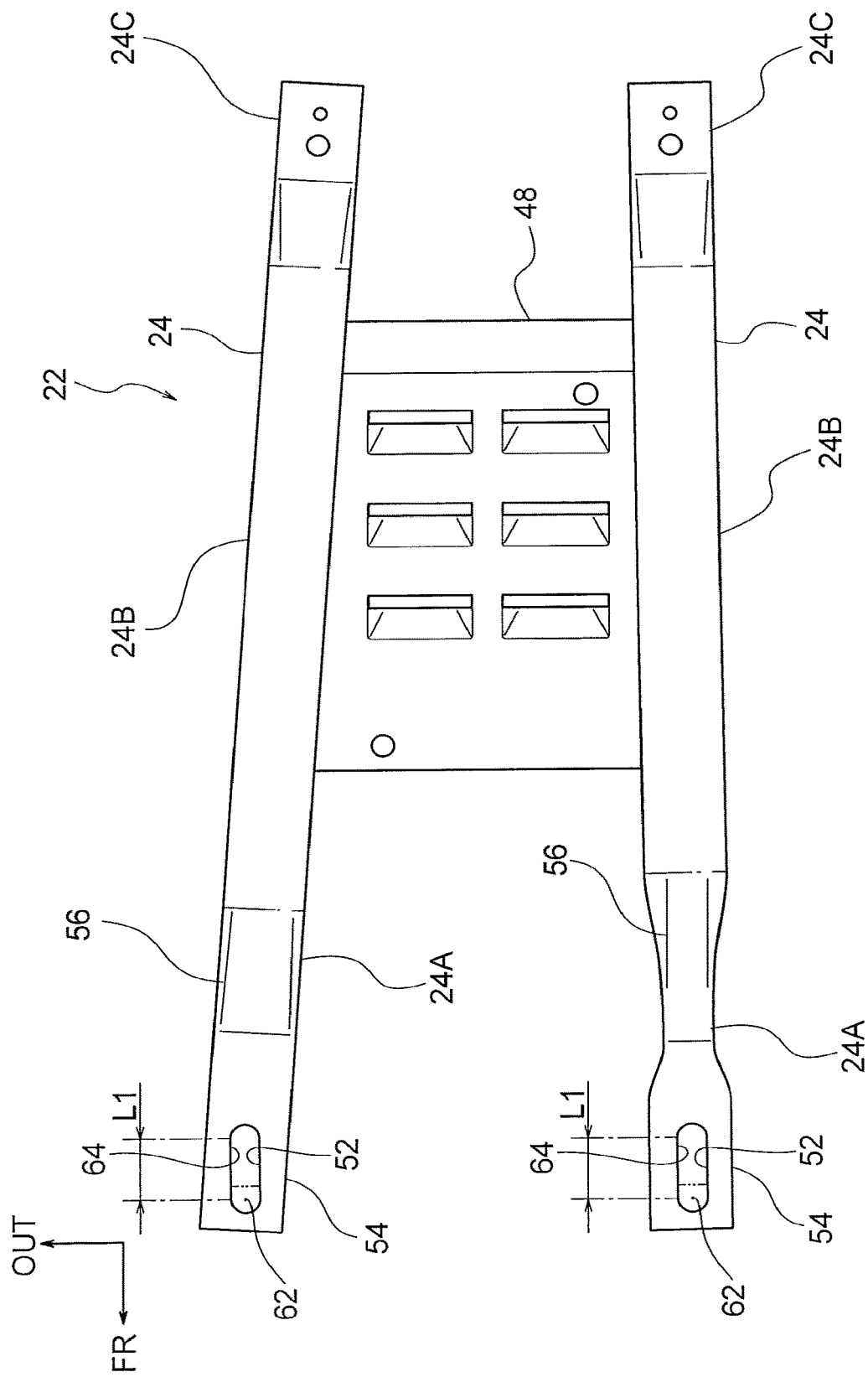
FIG. 11 is a perspective view of an oil pan guard in a vehicle lower portion structure according to a fourth embodiment viewed from above the vehicle.
Figure 12:
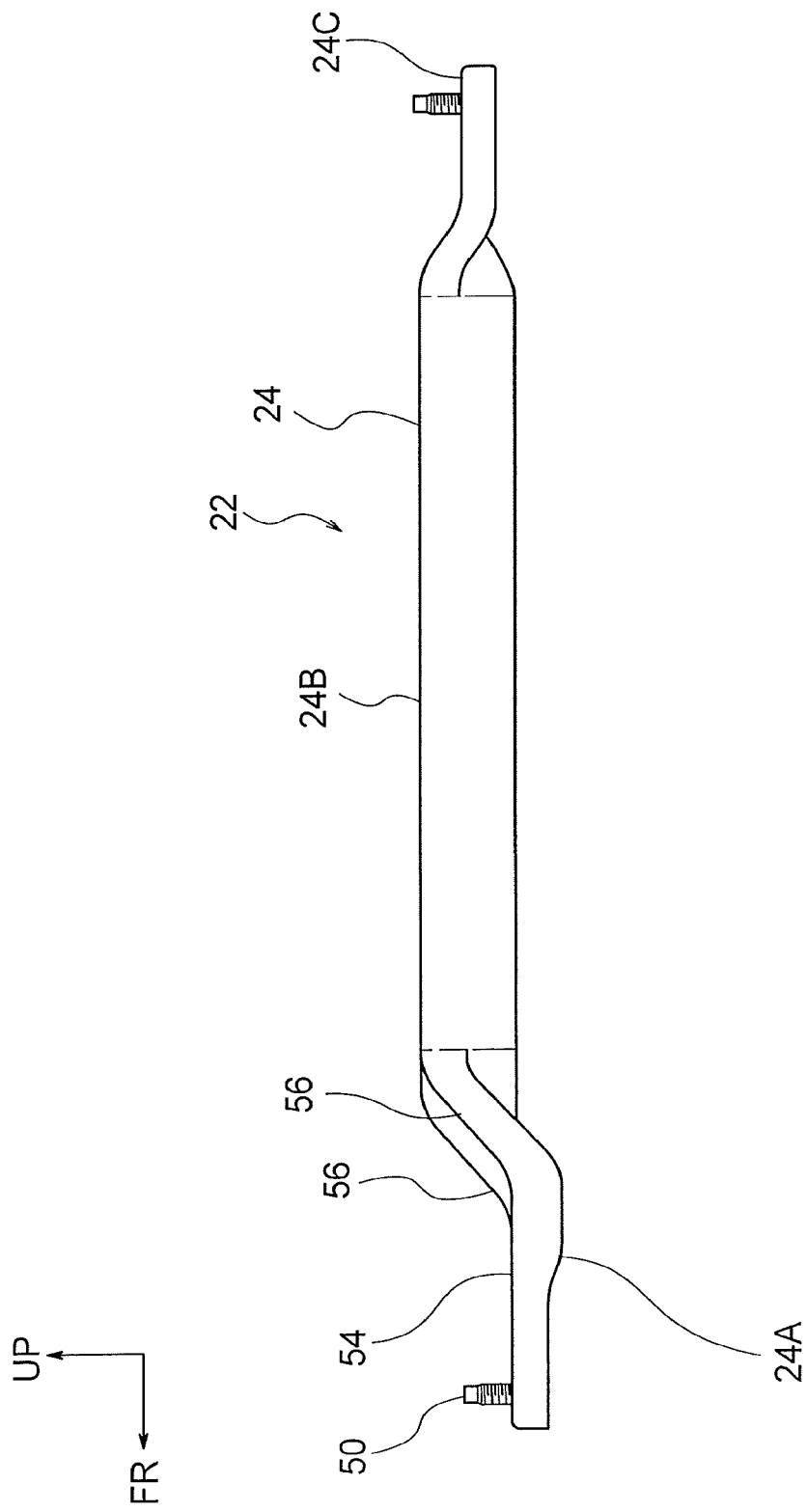
FIG. 12 is a side view of the oil pan guard in the vehicle lower portion structure according to the fourth embodiment.

Next, the vehicle lower portion structure 12 according to a fourth embodiment will be described.
Insertion Hole As shown in FIG. 11, the insertion hole 52 of the fourth embodiment includes the tied-up section L1 in which the insertion hole 52 has a fixed size in the vehicle width direction in the region from the fastening position 62 to the passable portion 64, without having the wider width section L2. In addition, the brace member 24 of the fourth embodiment has the front portion 24A which is longer than that of the first embodiment. The other features of the fourth embodiment are basically the same as those of the first embodiment. It should be noted that a longitudinal dimension of the passable portion 64 along the vehicle longitudinal direction is defined to be greater than the outer diameter of the threaded portion of the bolt 50, and a longitudinal dimension of the insertion hole 52 along the vehicle longitudinal direction is more than two times the outer diameter of the threaded portion of the bolt 50.

Operation and Effect

Next, operations and effects of the vehicle lower portion structure 12 according to the fourth embodiment will be described.

In the fourth embodiment, when the No. 2 cross member 16 and the No. 3 cross member 18 attempt to shorten a longitudinal distance from each other in response to the frontal collision of the vehicle 10, the bolt 50 is moved relative to the brace member 24 toward the passable portion 64 within the insertion hole 52. This can suppress, at the occurrence of the frontal collision, the capability of the brace member 24 functioning to hinder deformation of the pair of side rails 14, and thus prevent a decrease in the amount of collision energy to be absorbed by the pair of side rails 14.

Embodiment 5

Figure 13:
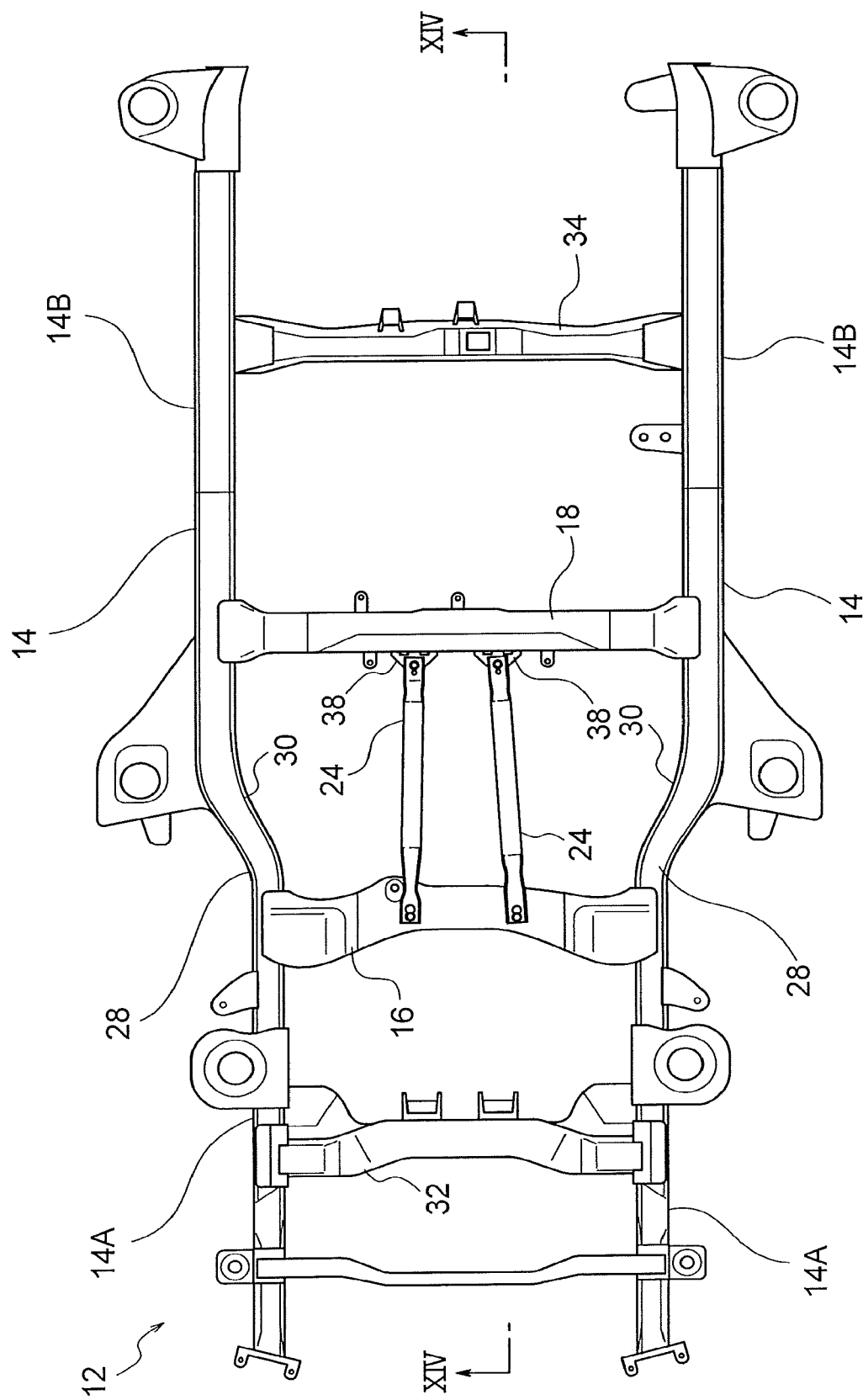
FIG. 13 is a bottom view of the vehicle according to a fifth embodiment, showing a frame portion of the vehicle in which a vehicle lower portion structure of this disclosure is applied.
Figure 14:
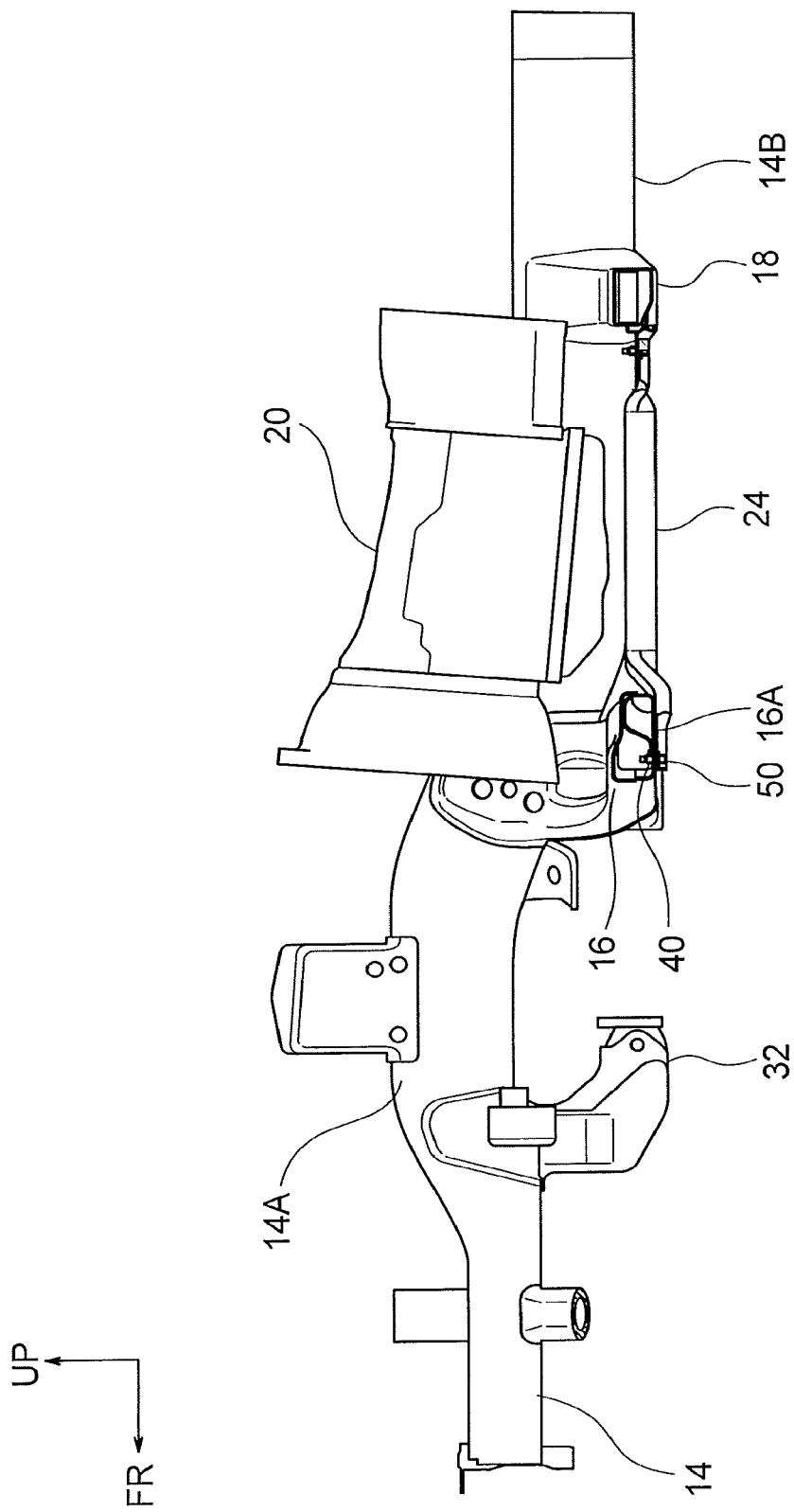
FIG. 14 is a side view of the frame portion of the vehicle, which is illustrated in a state cut along line XIV-XIV in FIG. 13 together with a brace member, and viewed from the inner side of the door along the thickness direction of the door.

Next, the vehicle lower portion structure 12 according to a fifth embodiment will be described.
Brace Member As shown in FIGS. 13 and 14, in the fifth embodiment, the plate shaped member 48 is not suspended between the pair of brace members 24 in contrast to the above-described embodiments, while the pair of brace members 24 are installed with the intention of focusing on the function of the brace members 24 working as the load transfer member at the occurrence of an asymmetrical collision. The other features in the fifth embodiment are basically the same as those in the first embodiment.
Operation and Effect Next, operations and effects of the vehicle lower portion structure 12 according to the fifth embodiment will be described.

At the occurrence of an asymmetrical collision of the vehicle 10 according to the fifth embodiment, the tied-up section L1 limits the relative movement, within the insertion hole 52, of the bolt 50 which fastens the brace member 24 onto the No. 2 cross member 16. This allows the brace member 24 to be utilized as the load transfer member at the occurrence of the asymmetrical collision, to thereby prevent excessive deformation of the side rail 14. On the other hand, at the occurrence of a frontal collision, because the bolt 50 is movable relative to the brace member 24 with respect to the insertion hole 52 toward the passable portion 64 in the insertion hole 52, to impair the functioning of the brace member 24 as the load transfer member, it becomes possible to suppress the capability of the brace member 24 functioning to hinder deformation of the pair of side rails 14, and accordingly prevent a decrease in the amount of collision energy to be absorbed by the pair of side rails 14.

. Variations of Embodiment

In the vehicle lower portion structure 12, the first curved portion 28 and the second curved portion 30 are not necessarily be formed on the side rail 14. For example, a bent portion which has a cranked shape in a plan view of the vehicle may be formed on the side rail 14. Further, the first curved portion 28 of the side rail 14 may be curved so as to cause the rear portion, in the vehicle longitudinal direction, of the side rail 14 to be displaced downwardly along the vehicle vertical direction from the front portion of the side rail 14, rather than being displaced outwardly along the vehicle longitudinal direction from the front portion of the side rail 14. In addition, the side rail 14 may be provided with a vulnerable portion (such as a bead portion) whose load bearing capacity is lower than that of the other portions of the side rail 14, to establish, in the vulnerable portion, a starting point of deformation at the occurrence of a collision.

In addition, one of the brace members 24 may include all of the first joint portion, the first sloped wall portion 56, the second joint portion, and the second sloped wall portion 60. Further, the brace members 24 may be suspended between any adjacent ones of the cross members along the vehicle longitudinal direction, rather than being suspended between the No. 2 cross member 16 and the No. 3 cross member 18.

The central portion 24B of the brace member 24 may be hollow or solid in cross section taken along the direction perpendicular to the vehicle longitudinal direction. Further, the central portion 24B of the brace member 24 may be rectangular in the cross section taken along the direction perpendicular to the vehicle longitudinal direction.

The first joint portion, which has been implemented by the ridge line 16E of the No. 2 cross member 16 in the above-described embodiments, may be a joint surface which is formed between the bottom surface 16A and the rear surface 16B of the No. 2 cross member 16 to connect the surfaces 16A, 16B, and is arranged to face the first sloped wall portion 56. Meanwhile, the second joint portion, which has been implemented by the joint surface 18F of the No. 3 cross member 18 in the above-described embodiments, may be a ridge line which is formed between the bottom surface 18A and the rear surface 18B of the No. 3 cross member 18, and is arranged to face the second sloped wall portion 60.

While the first to fifth embodiments have been described above, the embodiments and modification examples thereof may be combined as appropriate, and the present disclosure may be implemented in various forms without departing from the spirit or scope of the appended claims.

The invention claimed is:

1. A vehicle lower portion structure, comprising:
   a pair of right and left side members that are extended along a vehicle longitudinal direction on both sides of a vehicle width direction of a vehicle, and constitute a part of a vehicle body;
   a first cross member that is suspended between the pair of side members along the vehicle width direction;
   a second cross member that is suspended between the pair of side members along the vehicle width direction, and arranged rearward in the vehicle longitudinal direction of the first cross member so as to be spaced from the first cross member in the vehicle longitudinal direction;
   an on-board component that is mounted on the vehicle body in a lower portion of the vehicle; and
   a guard member that is disposed downward, in a vehicle vertical direction, of the on-board component, wherein the guard member includes a brace member that is suspended between the first cross member and the second cross member along the vehicle longitudinal direction and fastened to at least one of the first cross member and the second cross member by a bolt, the brace member having an insertion hole through which the bolt is inserted,
   the insertion hole is formed in a shape of an elongated hole including a passable portion that is extended from a fastening position where the bolt inserted through the insertion hole is tightened to fasten the brace member, toward a center region, in the vehicle longitudinal direction, of the brace member, and
   the insertion hole includes, in a region from the fastening position to the passable portion, a tied-up section in which a size of the insertion hole in the vehicle width direction is not increased.

2. The vehicle lower portion structure according to claim 1, wherein the insertion hole includes a wider width section in which the size of the insertion hole in the vehicle width direction is defined to be greater than that in the fastening position, so as not to limit relative vertical movement of the bolt in the passable portion.

3. The vehicle lower portion structure according to claim 2, wherein:
   the first cross member comprises;
   a bottom surface that faces downward in the vehicle vertical direction, and
   a rear surface that is joined to the bottom surface via a first joint portion and arranged on a rear portion of the first cross member so as to face rearward in the vehicle longitudinal direction, and
   the brace member comprises;
   a first bottom portion that is formed substantially in parallel with the bottom surface of the first cross member so as to face the bottom surface, the first bottom portion in which the insertion hole is defined, and
   a first sloped wall portion that is formed in a rear portion of the first bottom portion so as to be raised above toward a rear region, and located rearward, in the vehicle longitudinal direction, of the first joint portion in the first cross member.

4. The vehicle lower portion structure according to claim 2, wherein:
   the second cross member comprises;
   a bottom surface that faces downward in the vehicle vertical direction, and
   a front surface that is joined to the bottom surface via a second joint portion and arranged on a front portion of the second cross member so as to face forward in the vehicle longitudinal direction; and
   the brace member comprises;
   a second bottom portion that is formed substantially in parallel with the bottom surface of the second cross member so as to face the bottom surface, the second bottom portion in which the insertion hole is defined, and
   a second sloped wall portion that is formed in a front portion of the second bottom portion so as to be raised above toward a front region, and located forward, in the vehicle longitudinal direction, of the second joint portion in the second cross member.

5. The vehicle lower portion structure according to claim 1, wherein the insertion hole includes a wider width section in which a size of the insertion hole in the vehicle width direction is defined to be greater than that in the fastening position, so as not to limit relative vertical movement of the bolt in the passable portion.

6. The vehicle lower portion structure according to claim 5, wherein:
   the first cross member comprises;
   a bottom surface that faces downward in the vehicle vertical direction, and
   a rear surface that is joined to the bottom surface via a first joint portion and arranged on a rear portion of the first cross member so as to face rearward in the vehicle longitudinal direction, and
   the brace member comprises;

a first bottom portion that is formed substantially in parallel with the bottom surface of the first cross member so as to face the bottom surface, the first bottom portion in which the insertion hole is defined, and a first sloped wall portion that is formed in a rear portion of the first bottom portion so as to be raised above toward a rear region, and located rearward, in the vehicle longitudinal direction, of the first joint portion in the first cross member.

7. The vehicle lower portion structure according to claim 5, wherein:

the second cross member comprises;

a bottom surface that faces downward in the vehicle vertical direction, and a font surface that is joined to the bottom surface via a second joint portion and arranged on a front portion of the second cross member so as to face forward in the vehicle longitudinal direction; and the brace member comprises;

a second bottom portion that is formed substantially in parallel with the bottom surface of the second cross member so as to face the bottom surface, the second bottom portion in which the insertion hole is defined, and a second sloped wall portion that is formed in a front portion of the second bottom portion so as to be raised above toward a front region, and located forward, in the vehicle longitudinal direction, of the second joint portion in the second cross member.

8. The vehicle lower portion structure according to claim 1, wherein:

each of the pair of side members comprises a first curved portion which is curved so as to cause a rear portion of the each of the pair of side members to be outwardly displaced from a front portion thereof, and a second curved portion which is arranged rearward of the first curved portion and curved so as to align the each of the pair of side members with the vehicle longitudinal direction, and the first curved portion and the second curved portion are formed on a site situated, in the vehicle longitudinal direction, between a location where the first cross member is suspended and a location where the second cross member is suspended on the each of the pair of side members.

9. The vehicle lower portion structure according to claim 1, wherein:

the brace member has a region having a closed shape in cross section taken along a direction perpendicular to the vehicle longitudinal direction, and comprises a pair of brace members that are arranged so as to be spaced from each other in the vehicle width direction; and the guard member further comprises a plate shaped member suspended between the pair of brace members.

10. A vehicle lower portion structure, comprising:

a pair of right and left side members that are extended along a vehicle longitudinal direction on both sides of a vehicle width direction of a vehicle, and constitute a part of a vehicle body;

a first cross member that is suspended between the pair of side members along a vehicle width direction;

a second cross member that is suspended between the pair of side members along the vehicle width direction, and arranged rearward in the vehicle longitudinal direction of the first cross member so as to be spaced from the first cross member in the vehicle longitudinal direction; and a brace member that is suspended along the vehicle longitudinal direction between the first cross member and the second cross member, and fastened to at least one of the first cross member or the second cross member by a bolt, the brace member having an insertion hole through which the bolt is inserted; wherein the insertion hole is formed in a shape of an elongated hole including a passable portion that is extended toward a center region of the brace member from a fastening position where the bolt inserted through the insertion hole is tightened to fasten the brace member, and a tied-up section in which a size, in the vehicle width direction, of the insertion hole is not increased in a region from the fastening position to the passable portion.

11. The vehicle lower portion structure according to claim 10, wherein the insertion hole comprises a wider width section in which the size, in the vehicle width direction, of the insertion hole is defined to be greater than that in the fastening position, so as not to limit relative vertical movement of the bolt in the passable portion.

12. The vehicle lower portion structure according to claim 11, wherein:

the first cross member comprises;

a bottom surface that faces downward in the vehicle vertical direction, and a rear surface that is joined to the bottom surface via a first joint portion and arranged on a rear portion of the first cross member so as to face rearward in the vehicle longitudinal direction, and the brace member comprises;

a first bottom portion that is formed substantially in parallel with the bottom surface of the first cross member so as to face the bottom surface, the first bottom portion in which the insertion hole is defined, and a first sloped wall portion that is formed in a rear portion of the first bottom portion so as to be raised above toward a rear region, and located rearward, in the vehicle longitudinal direction, of the first joint portion in the first cross member.

13. The vehicle lower portion structure according to claim 11, wherein:

the second cross member comprises;

a bottom surface that faces downward in the vehicle vertical direction, and a front surface that is joined to the bottom surface via a second joint portion and arranged on a front portion of the second cross member so as to face forward in the vehicle longitudinal direction; and the brace member comprises;

a second bottom portion that is formed substantially in parallel with the bottom surface of the second cross member so as to face the bottom surface, the second bottom portion in which the insertion hole is defined, and a second sloped wall portion that is formed in a front portion of the second bottom portion so as to be raised above toward a front region, and located forward, in the vehicle longitudinal direction, of the second joint portion in the second cross member.

14. The vehicle lower portion structure according to claim 10, wherein:

each of the pair of side members comprises a first curved portion which is curved so as to cause a rear portion of the each of the pair of side members to be outwardly displaced from a front portion thereof, and a second curved portion which is arranged rearward of the first curved portion and curved so as to align the each of the pair of side members with the vehicle longitudinal direction, and the first curved portion and the second curved portion are formed on a site situated, in the vehicle longitudinal direction, between a location where the first cross member is suspended and a location where the second cross member is suspended on each of the pair of side members.

* * * * *